United States Patent
Naya et al.

(10) Patent No.: US 11,198,352 B2
(45) Date of Patent: Dec. 14, 2021

(54) ELECTRICITY STORAGE DEVICE CONTROLLER, ELECTRIC SYSTEM AND CONSTRUCTION MACHINE

(71) Applicants: Hitachi Construction Machinery Co., Ltd., Tokyo (JP); Hitachi Automotive Systems, Ltd., Hitachinaka (JP)

(72) Inventors: Itaru Naya, Tsuchiura (JP); Seiji Ishida, Hitachinaka (JP); Ken Takeuchi, Kasumigaura (JP); Mutsumi Kikuchi, Mito (JP)

(73) Assignees: Hitachi Construction Machinery Co., Ltd., Tokyo (JP); Hitachi Automotive Systems, Ltd., Hitachinaka (JP)

( * ) Notice: Subject to any disclaimer, the term of this patent is extended or adjusted under 35 U.S.C. 154(b) by 300 days.

(21) Appl. No.: 16/604,196

(22) PCT Filed: Apr. 12, 2018

(86) PCT No.: PCT/JP2018/015382
§ 371 (c)(1),
(2) Date: Oct. 10, 2019

(87) PCT Pub. No.: WO2018/190400
PCT Pub. Date: Oct. 18, 2018

(65) Prior Publication Data
US 2020/0039339 A1 Feb. 6, 2020

(30) Foreign Application Priority Data

Apr. 14, 2017 (JP) .............................. JP2017-080496

(51) Int. Cl.
*B60K 6/26* (2007.10)
*B60K 6/485* (2007.10)
(Continued)

(52) U.S. Cl.
CPC ................ *B60K 6/26* (2013.01); *B60K 6/485* (2013.01); *B60W 10/08* (2013.01); *B60W 20/50* (2013.01); *F04B 49/06* (2013.01); *H02H 7/18* (2013.01)

(58) Field of Classification Search
CPC ......... B60K 6/26; B60K 6/485; B60W 10/08; B60W 20/50; B60W 10/26; B60W 10/30;
(Continued)

(56) References Cited

U.S. PATENT DOCUMENTS

2008/0143183 A1    6/2008  Hoshiba
2009/0044993 A1*   2/2009  Bissontz ............. B60W 30/188
                                                  180/65.245
(Continued)

FOREIGN PATENT DOCUMENTS

JP   2006-217743 A    8/2006
JP   2008-312396 A   12/2008
(Continued)

OTHER PUBLICATIONS

Korean-language Office Action issued in Korean Application No. 10-2019-7026269 dated Jul. 2, 2020 with English translation (10 pages).

(Continued)

*Primary Examiner* — George C Jin
(74) *Attorney, Agent, or Firm* — Crowell & Moring LLP

(57) ABSTRACT

A relay (25) connects and disconnects an electrical circuit to which an inverter (16) and an electricity storage device (19) are connected. A BCU (22) controls the electricity storage device (19). An HC (27) controls an electric motor (15), the inverter (16) and the BCU (22). The HC (27) and the BCU (22) respectively have FET switches (30, 31) for controlling supply and stop of the excitation current in the relay (25). When the electricity storage device (19) is determined to be
(Continued)

in an abnormal state, the BCU (22) transmits an abnormal signal to the HC (27), and when a predetermined time has elapsed, turns off (opens) the first FET switch (30) of the BCU (22). The HC (27) executes stop processing based upon the abnormal signal received from the BCU (22) and then turns off (opens) the second FET switch (31) of the HC (27).

10 Claims, 10 Drawing Sheets

(51) Int. Cl.
*B60W 10/08* (2006.01)
*B60W 20/50* (2016.01)
*F04B 49/06* (2006.01)
*H02H 7/18* (2006.01)

(58) Field of Classification Search
CPC ... B60W 10/06; B60W 2300/17; F04B 49/06; H02H 7/18; Y02T 10/70; Y02T 10/7072; Y02T 10/72; Y02T 10/60; B60L 2250/10; B60L 50/16; B60L 50/51; B60L 3/04; B60L 3/0046; B60Y 2200/92; B60Y 2200/41; H02J 7/0029; H02J 7/00; E02F 9/20
See application file for complete search history.

(56) References Cited

U.S. PATENT DOCUMENTS

| | | | |
|---|---|---|---|
| 2011/0024255 A1* | 2/2011 | Gomm | B60K 6/46 192/84.1 |
| 2013/0058750 A1* | 3/2013 | Hiroki | B60L 1/003 414/744.2 |
| 2014/0002091 A1 | 1/2014 | Edamura et al. | |
| 2015/0229154 A1 | 8/2015 | Kaita et al. | |
| 2017/0070065 A1* | 3/2017 | Weflen | F04B 35/04 |
| 2018/0265089 A1* | 9/2018 | Inaba | B60W 10/08 |

FOREIGN PATENT DOCUMENTS

| | | |
|---|---|---|
| JP | 2010-193558 A | 9/2010 |
| JP | 2012-198132 A | 10/2012 |
| JP | 2013-129976 A | 7/2013 |
| JP | 2014-110685 A | 6/2014 |
| JP | 2016-61016 A | 4/2016 |
| KR | 10-2011-0071837 A | 6/2011 |

OTHER PUBLICATIONS

International Search Report (PCT/ISA/210) issued in PCT Application No. PCT/JP2018/015382 dated Jul. 17, 2018 with English translation (four pages).

Japanese-language Written Opinion (PCT/ISA/237) issued in PCT Application No. PCT/JP2018/015382 dated Jul. 17, 2018 (seven pages).

* cited by examiner

ELECTRICITY STORAGE DEVICE CONTROLLER, ELECTRIC SYSTEM AND CONSTRUCTION MACHINE

TECHNICAL FIELD

The present invention relates to an electricity storage device controller, an electric system provided with the electricity storage device controller and a construction machine on which the electric system is mounted.

BACKGROUND ART

As the background art in regard to the technical field, there are techniques disclosed in Patent Document 1 and Patent Document 2. Patent Document 1 discloses the technique on disconnection of a relay at the vehicle stop request in a motor/generator and a high voltage circuit of an electric vehicle. Patent Document 2 discloses the technique on disconnection of a relay at the system main relay disconnection request due to a hybrid system failure.

PRIOR ART DOCUMENT

Patent Document

Patent Document 1: Japanese Patent Laid-Open No. 2010-193558 A (Japanese Patent No. 5233725 B)
Patent Document 2: Japanese Patent Laid-Open No. 2006-217743 A

SUMMARY OF THE INVENTION

Recently, as measures of environment destruction prevention, the tightening of emission regulations of gases emitted due to combustion of fuel or low fuel consumption of a system with an internal combustion engine as a power source has been in progress by developed countries as leaders. As one of the measures, the approach of motorizing the power source mounted on the system has been made. The motorization of the power source can be achieved by using an electricity storage device storing power as the power source and driving an electric motor mechanically connected to a driven body with the power supplied from the electricity storage device. The electricity storage device is provided with a plurality of capacitors electrically connected in series, in parallel, or in series and in parallel. In many cases a secondary cell such as a lithium-ion cell, a lead cell or a nickel-hydrogen cell is used in the capacitor. Recently, among the secondary cells, adoption of the lithium-ion cell high in output of energy and in volumetric density in capacity has spread as the mainstream.

For continuing to safely use of the electricity storage device over a long period of time, the capacitor is required to be not used over the use range. That is, it is required to control charge/discharge of the capacitor in such a manner that a voltage, a charge/discharge current, a temperature, a charging state, a degradation state and the like of the capacitor are monitored to prevent the capacitor from leading to an abnormal state such as overcharge, over-discharge or an overtemperature. Therefore, the electricity storage device is provided with a controller configured to manage the aforementioned monitoring and control. In a case where the capacitor becomes in the abnormal state such as overcharge, over-discharge or an overtemperature, it is necessary to disconnect an electrical circuit between the electricity storage device and the electric motor and electrically disconnect the electricity storage device from the electric motor side. Therefore, a relay is provided in the electrical circuit between the electricity storage device and the electric motor, as described in Patent Document 1 for example. The relay can input or disconnect a contact point by controlling an operating current (an excitation current flowing in an excitation coil), as described in Patent Document 2.

In the background art, however, the operating current of the relay is controlled by a single control system. Therefore, in a case where the control system controlling the operating current in the relay is in failure or erroneously operated, the relay is not normally operated and the electricity storage device is not disconnected electrically from the electric motor side, possibly leading the capacitor to the abnormal state such as overcharge, over-discharge or an overtemperature.

In view of the above-mentioned, one of the problems to be solved by the present invention is to improve certainty on the circuit disconnection by the relay.

One of the problems can be solved in such a manner that a relay control section configured to control supply and stop of an operating current in a relay is provided in each of at least two controllers and the supply or stop of the operating current in the relay can be achieved by the relay control section in each of the controllers. In this case, it is preferable that the supply or the stop of the operating current in the relay by the relay control section in one of the controllers can be achieved without any relation to the supply or stop of the operating current in the relay by the relay control section in the other of the controllers. In addition, it is preferable that the supply or the stop of the operating current in the relay by the relay control section by the one of the controllers is achieved after a predetermined time has elapsed from a point when the supply or stop of the operating current in the relay is required, for example, a time until the current flowing between the electricity storage device and the electric motor becomes in a zero state by the disconnection of the relay or a time until the supply of the operating current in the relay by the relay control section in the other of the controllers is stopped has elapsed.

Here, according to one aspect of the present invention, a construction machine includes: an electric motor; a hydraulic pump driven by the electric motor; a hydraulic device driven by pressurized oil delivered from the hydraulic pump; an electricity storage device that supplies power to the electric motor; an inverter provided between the electricity storage device and the electric motor to convert the power; a main controller that controls the hydraulic pump and the hydraulic device; an electricity storage device controller that controls the electricity storage device; an equipment controller that controls the electric motor, the inverter and the electricity storage device controller; and a relay connecting or disconnecting an electrical circuit to which the inverter and the electricity storage device are connected, characterized in that: the equipment controller and the electricity storage device controller each include an excitation current control section that controls supply and stop of an excitation current in the relay.

According to another aspect of the present invention, an electric system includes: an electric motor driving a driven body; an electricity storage device that supplies power to the electric motor; an inverter provided between the electric motor and the electricity storage device to convert the power supplied from the electricity storage device and supply the converted power to the electric motor; a relay provided between the electricity storage device and the inverter to electrically connect or disconnect the electricity storage device and the inverter; an electricity storage device controller that manages a state of the electricity storage device; an upper controller that communicates with the electricity storage device controller, characterized in that: the electricity storage device controller and the upper controller each include a relay control section that controls supply and stop of an operating current in the relay.

Further, according to a further other aspect of the present invention, an electricity storage device controller in an electricity storage device that is connected electrically via a relay to an inverter and supplies power via the inverter to an electric motor driving a driven body, includes: an electricity storage device abnormal state notifying section configured to, when the electricity storage device becomes in an abnormal state of electrically disconnecting the electricity storage device and the inverter by the relay, notify an upper controller provided with a relay control section that controls supply and stop of an operating current in the relay of the abnormal state of the electricity storage device; and a relay control section configured to, when the electricity storage device becomes in the abnormal state of electrically disconnecting the electricity storage device and the inverter by the relay, stop the supply of the operating current in the relay with no relation to whether or not the supply of the operating current in the relay is stopped by the upper controller notifying the abnormal state of the electricity storage device.

According to the present invention, it is possible to improve certainty of the circuit disconnection by the relay.

That is, an explanation will be made of a construction machine as one aspect of the present invention, as an example, the equipment controller and the electricity storage device controller each include the excitation current control section (the relay control section). That is, the supply and the stop of the excitation current in the relay can be controlled by the excitation current control section in the equipment controller and also by the excitation current control section in the electricity storage device controller. Therefore, even when one controller of the equipment controller and the electricity storage device controller is in failure or is erroneously operated, it is possible to disconnect the relay by stopping the excitation current in the relay with the excitation current control section of the other controller. Accordingly, it is possible to improve the certainty of the stop of the excitation current in the relay, that is, the certainty of the disconnection of the relay. As a result, it is possible to improve the safety of the mounted equipment and the vehicle body in the construction machine.

MODE FOR CARRYING OUT THE INVENTION

Figure 1:
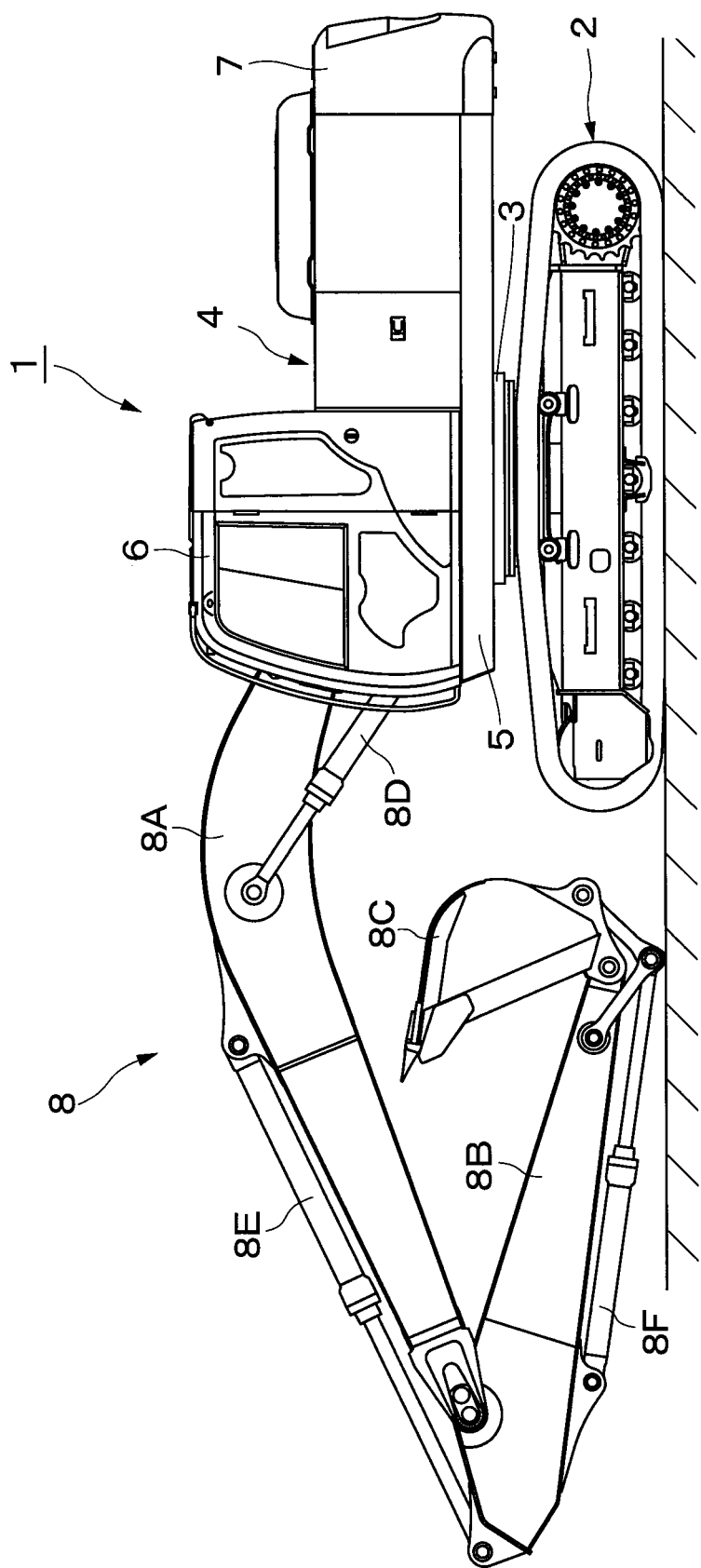
FIG. 1 is a front view showing a hybrid hydraulic excavator according to a first embodiment of the present invention.

Hereinafter, a hybrid hydraulic excavator as an example of a construction machine according to an embodiment in the present invention will be explained with reference to the accompanying drawings.

It should be noted that embodiments to be hereinafter described will be explained by taking a hybrid hydraulic excavator on which a lithium-ion cell is mounted, as an example, but the present invention is not limited thereto. For example, the present invention can be applied to various kinds of hybrid construction machines such as a hybrid wheel loader or a hybrid dump truck, using power of a hydraulic pump driven by an electric motor connected to an electricity storage device and an engine as a power source. In addition, the present invention can be applied to various kinds of electric construction machines using an electricity storage device as a power source, further, various kinds of industrial machines composed of the similar equipment structure.

FIG. 1 to FIG. 8 show a first embodiment of the present invention. A hybrid hydraulic excavator 1 (hereinafter, referred to as "hydraulic excavator 1") is provided with an engine 11 and an electric motor 15, which will be described later. The hydraulic excavator 1 includes an automotive lower traveling structure 2 of a crawler type, a revolving device 3 that is provided on the lower traveling structure 2, an upper revolving structure 4 that is mounted through the revolving device 3 on the lower traveling structure 2 to be capable of revolving thereon, and a working mechanism 8 of an articulated structure that is provided in the front side of the upper revolving structure 4 and performs an excavating operation of earth and sand, and the like. At this time, the lower traveling structure 2 and the upper revolving structure 4 configure a vehicle body of the hydraulic excavator 1.

The upper revolving structure 4 includes a revolving frame 5 as a support structure (a base frame) of the upper revolving structure 4, a cab 6, a counterweight 7, the engine 11, a hydraulic pump 13, the electric motor 15, an inverter 16, an electricity storage device 19 and the like, which are mounted on the revolving frame 5.

The cab 6 defining an operation room is provided in the front left side of the revolving frame 5. An operator's seat on which an operator sits is provided in the cab 6. Operation devices for operating the hydraulic excavator 1, that is, a traveling lever/pedal operation device, a working lever operation device (none of them is shown) and the like are provided on the periphery of the operator's seat.

The operation device outputs a pilot signal (a pilot pressure) in response to a lever operation or a pedal operation by an operator to a control valve 14 to be described later (see, FIG. 2). As a result, the operator can operate (drive) hydraulic devices (hydraulic actuators) in the hydraulic excavator 1, that is, a traveling hydraulic motor 2A, a bucket cylinder 8F, an arm cylinder 8E, a boom cylinder 8D, a revolving hydraulic motor 3A (see, FIG. 2) and the like An ignition key switch (not shown) is provided in the cab 6 for performing on and off operations of the power source (on and off operations of accessories) in the hydraulic excavator 1 and start or stop of the engine 11. Further, a hybrid controller 27 and a main controller 28 to be described later (see, FIG. 2) are provided in the cab 6 to be located in the lower side backward of the operator's seat. Meanwhile, the counterweight 7 is located in the rear end side of the revolving frame 5 to act as a weight balance to the working mechanism 8.

As shown in FIG. 1, the working mechanism 8 is configured of, for example, a boom 8A, an arm 8B and a bucket 8C as a working tool, and a boom cylinder 8D, an arm cylinder 8E and a bucket cylinder 8F as a working tool cylinder, which drive which drive the boom 8A, the arm 8B and the bucket. The boom 8A, the arm 8B and the bucket 8C are joined to each other by pin.

The working mechanism 8 (the boom 8A thereof) is attached to the revolving frame 5 in the upper revolving structure 4. The working mechanism 8 extends or contracts the cylinders 8D, 8E, 8F to perform a lifting and tilting operation. The hydraulic excavator 1 travels with rotation of the traveling hydraulic motor 2A (see, FIG. 2) provided on the lower traveling structure 2. The upper revolving structure 4 revolves with rotation of the revolving hydraulic motor 3A (see, FIG. 2) configuring the revolving device 3 together with a revolving bearing (not shown).

Here, the hydraulic excavator 1 is provided thereon with an electric system that controls the electric motor 15 and the like, and a hydraulic system that controls operations of the working mechanism 8 and the like. Hereinafter, an explanation will be made of the system configuration in the hydraulic excavator 1 with reference to FIG. 2 and FIG. 3.

The engine 11 is mounted on the revolving frame 5. The engine 11 is configured of an internal combustion engine such as a diesel engine. As shown in FIG. 2, the hydraulic pump 13 and the electric motor 15 are attached mechanically to the output side of the engine 11 for serial connection. The hydraulic pump 13 and the electric motor 15 are driven by the engine 11.

Here, the engine 11 is configured of an electrically controlled engine, and an operation of the engine 11 is controlled by an engine control unit 21 (hereinafter, referred to as "ECU 12"). Specifically, in the engine 11, a supply quantity of fuel into cylinders (combustion chambers), that is, an injection quantity of a fuel injection device (an electrically controlled injection valve) for injecting fuel into the cylinders is variably controlled by the ECU 12 as a control section of the engine 11. In this case, the ECU 12 includes a microcomputer, and is connected to a main controller 28 (hereinafter, referred to as "MC 28") to be described later.

The ECU 12 variably controls a fuel injection quantity into the cylinders by the fuel injection device based upon a control signal (a command signal) from the MC 28 to control a rotational speed of the engine 11. That is, the ECU 12 controls an output torque, the rotational speed (engine rotational number) and the like of the engine 11 based upon an engine output command from the MC 28. It should be noted that the maximum output of the engine 11 is made smaller than the maximum power of the hydraulic pump 13, for example.

The hydraulic pump 13 is connected mechanically to the engine 11. The hydraulic pump 13 can be driven by the torque of the engine 11 alone. In addition, the hydraulic pump 13 can be driven by a compound torque (a total torque) acquired by adding an assist torque of the electric motor 15 to the torque of the engine 11. That is, the hydraulic pump 13 is driven by the mechanical power of the engine 11 and the electric motor 15. The hydraulic pump 13 pressurizes hydraulic oil reserved in a tank (not shown), which is delivered to the traveling hydraulic motor 2A, the revolving hydraulic motor 3A, the cylinders 8D, 8E and 8F of the working mechanism 8 as pressurized oil.

The hydraulic pump 13 is connected through the control valve 14 to the traveling hydraulic motor 2A, the revolving hydraulic motor 3A, and the cylinders 8D, 8E and 8F in the working mechanism 8 as the hydraulic devices (hydraulic actuators). The hydraulic pump 13 is configured of a variable displacement hydraulic pump of a swash plate type, a bent axis type or a radial piston type, for example. In this case, although the illustration is omitted, the hydraulic pump 13 has a regulator (a variable displacement part and a tilting actuator) for regulating a pump capacity. The hydraulic pump 13 (the regulator thereof) is variably controlled by a command from the MC 28 to be described later.

The control valve 14 is a control valve device formed of a plurality of directional control valves, a collector of a plurality of electromagnetic valves, and the like. The control valve 14 distributes hydraulic oil delivered from the hydraulic pump 13 to the hydraulic devices of the hydraulic motors 2A, 3A, the cylinders 8D, 8E, 8F and the like. That is, the control valve 14 controls a direction of the pressurized oil to be delivered to the hydraulic devices 2A, 3A, 8D, 8E, 8F from the hydraulic pump 13 in response to lever operations and pedal operations of the traveling lever/pedal operation device and the working lever operation device located in the cab 6, a command from the MC 28, and the like. Thereby, the hydraulic devices 2A, 3A, 8D, 8E, 8F are driven by the pressurized oil (the hydraulic oil) to be delivered from the hydraulic pump 13.

The electric motor 15, also called the motor or the motor generator, is connected mechanically to the engine 11. The electric motor 15 is configured of, for example, a synchronous electric motor and the like. The electric motor 15 plays two roles of power generation of performing power supply to the electricity storage device 19 by acting as an electric generator using the engine 11 as a power source, and power running of assisting in driving the engine 11 and the hydraulic pump 13 as driven bodies by acting as a motor using power from the electricity storage device 19 as a power source. Accordingly, the assist torque of the electric motor 15 is added to the torque of the engine 11 according to the situation, and the hydraulic pump 13 is driven by these torques. The traveling operation and the revolving operation of the vehicle, the tilting or the lifting operation of the working mechanism 8 and the like are performed by the pressurized oil delivered from the hydraulic pump 13.

Figure 2:
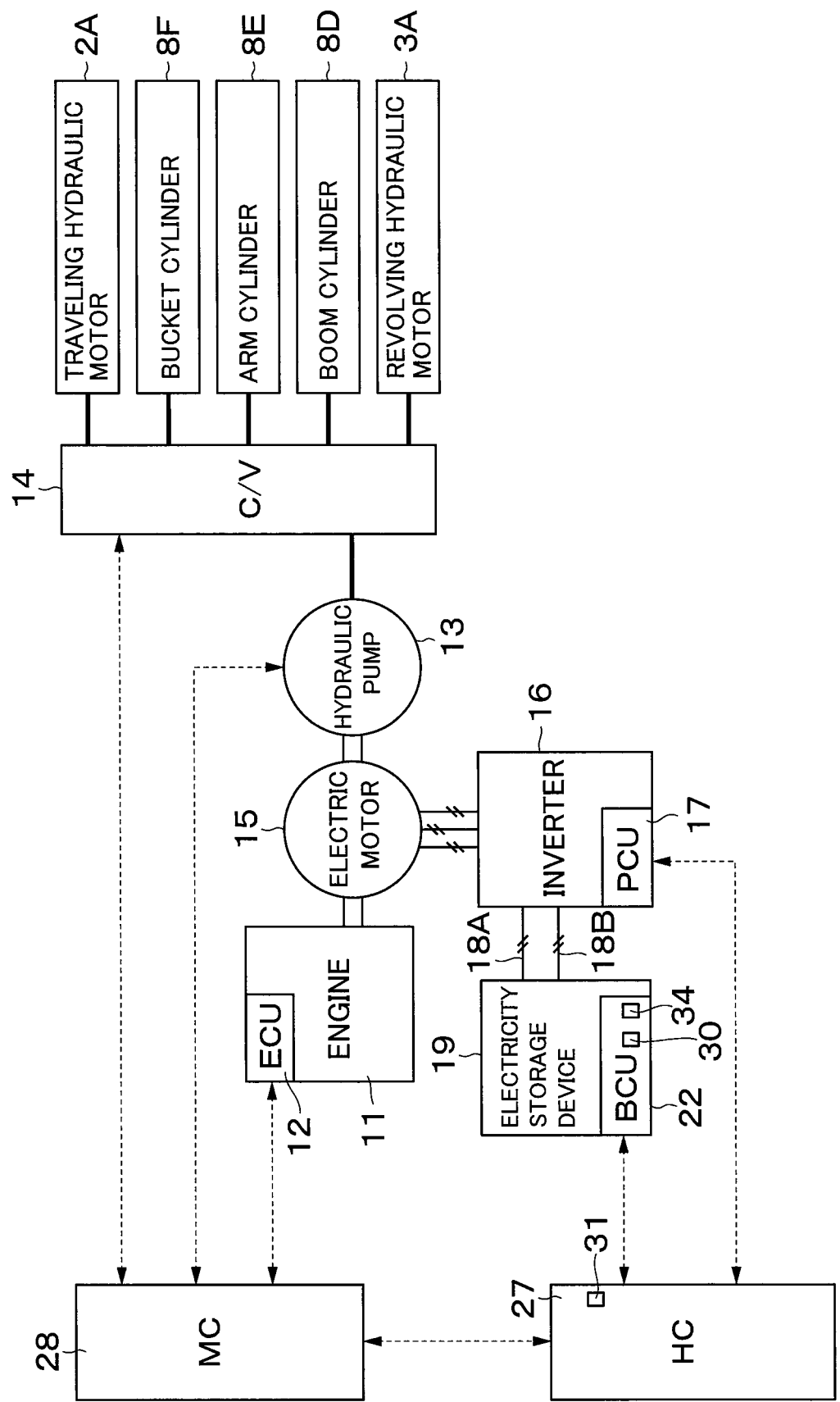
FIG. 2 is a block diagram showing a hydraulic system and an electric system that are applied to the hybrid hydraulic excavator in FIG. 1.

As shown in FIG. 2, the electric motor 15 is connected to a pair of DC buses 18A, 18B through the inverter 16. That is, the inverter 16 is provided between the electric motor 15 and the electricity storage device 19, and is connected electrically to the electric motor 15 and the electricity storage device 19. The inverter 16 performs conversion of power (energy conversion), and for example, is configured using a plurality of switching elements such as a transistor and an insulating gate bipolar transistor (IGBT).

On and off operation of each of the switching elements in the inverter 16 are controlled by a power control unit 17 (hereinafter, referred to as "PCU 17"). The PCU 17 includes a microcomputer, and is connected to the hybrid controller 27 to be described later (hereinafter, referred to as "HC 27"). The DC buses 18A, 18B are paired at a positive electrode side and at a negative electrode side, and, for example, a DC voltage of approximately several hundreds V is applied thereto.

At the power generation of the electric motor 15, the inverter 16 converts AC power from the electric motor 15 into DC power, which is supplied to the electricity storage device 19. At the power running operation of the electric motor 15, the inverter 16 converts the DC power of the DC buses 18A, 18B into AC power, which is supplied to the electric motor 15. The PCU 17 controls the on and off operation of each of the switching elements in the inverter 16 based upon a power generation electric motor output command from the HC 27, and the like. Thereby the PCU 17 controls power generation at the power generation time and drive power at the power running time of the electric motor 15.

The electricity storage device 19 is connected electrically via the inverter 16 to the electric motor 15. In this case, the electricity storage device 19 is connected via the DC buses 18A, 18B to a DC side positive electrode and a DC side negative electrode of the inverter 16. The electricity storage device 19 supplies drive power toward the electric motor 15 at the power running time (at the assist drive time) of the electric motor 15, and is charged with power supplied from the electric motor 15 at the power generation time of the electric motor 15. That is, the electricity storage device 19 supplies the power to the electric motor 15, or is charged with generation power supplied from the electric motor 15. In other words, the electricity storage device 19 performs the supply of the energy for driving the electric motor 15 and regeneration of the energy generated by the electric motor 15.

Figure 3:
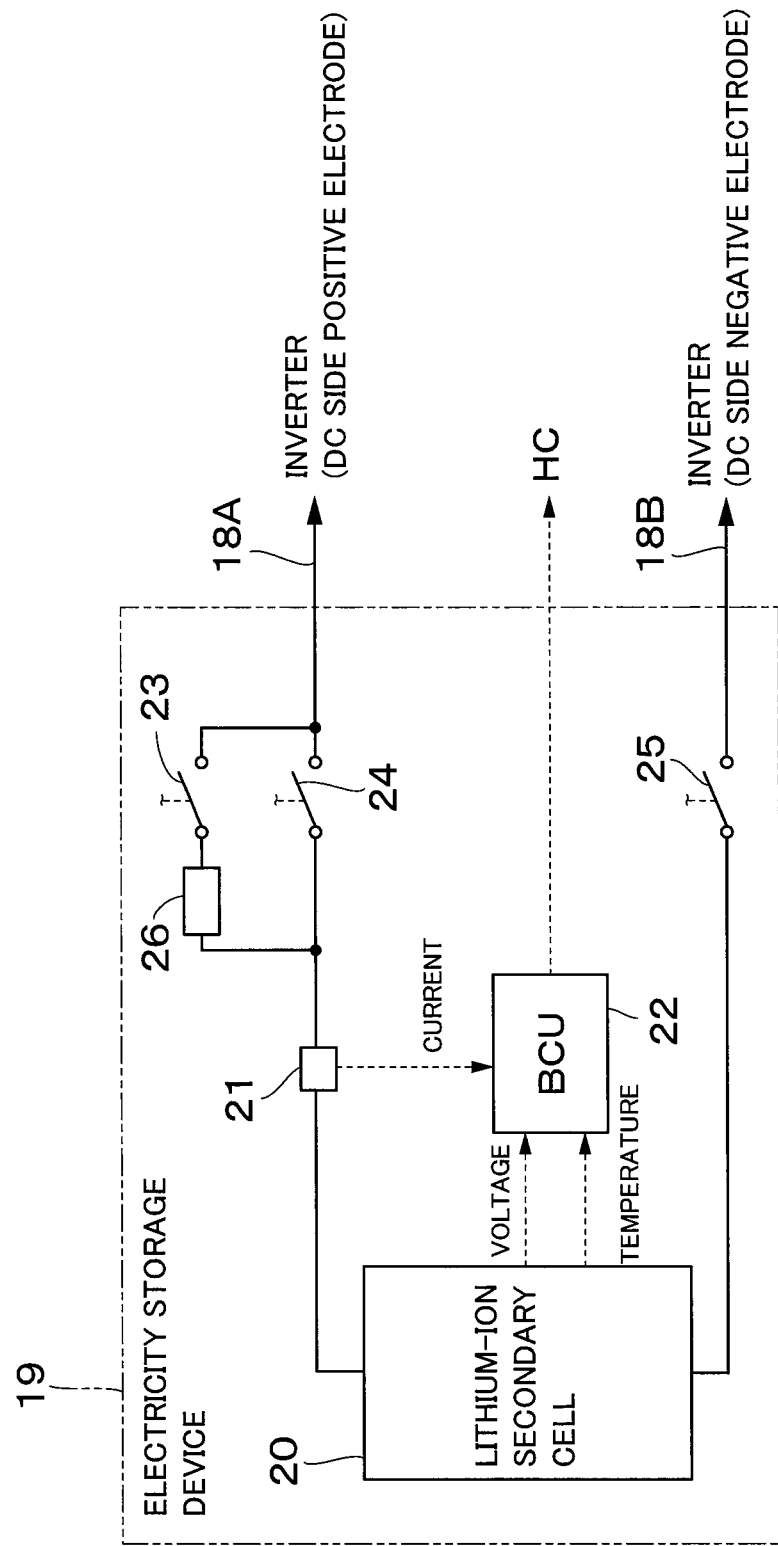
FIG. 3 is a block diagram showing an electricity storage device in FIG. 2.

As shown in FIG. 3, the electricity storage device 19 is provided with a lithium-ion secondary cell 20 corresponding to a capacitor (including a storage cell), a current sensor 21, a battery control unit 22 (hereinafter, referred to as "BCU 22"), relays 23, 24, 25 and a resistance 26, for example. The electricity storage device 19 is controlled by the BCU 22. Specifically, a charging operation or a discharging operation of the lithium-ion secondary cell 20 in the electricity storage device 19 is controlled by the HC 27 based upon information from the BCU 22.

Here, the lithium-ion secondary cell 20 is configured of an assembled battery by electrically connecting a plurality of battery cells in series or in parallel, or in series and in parallel. The current sensor 21 is connected to, for example, a terminal in the positive electrode side of the lithium-ion secondary cell 20 to detect (measure) the charging current or discharging current of the electricity storage device 19 (the lithium-ion secondary cell 20). An output side of the current sensor 21 is connected to the BCU 22. The current sensor 21 outputs a signal in accordance with the detected current to the BCU 22.

A current value detected by the current sensor 21 is inputted to the BCU 22, and in addition thereto, a voltage and a temperature of the lithium-ion secondary cell 20 are inputted thereto. Therefore, for example, the lithium-ion secondary cell 20 is provided with a voltage sensor (not shown) detecting (measuring) a voltage of the lithium-ion secondary cell 20, and a temperature sensor (not shown) detecting (measuring) a temperature of the lithium-ion secondary cell 20. The output side of the voltage sensor and the output side of the temperature sensor are connected to the BCU 22. The voltage sensor outputs a signal in accordance with the detected voltage to the BCU 22, and the temperature sensor outputs a signal in accordance with the detected temperature to the BCU 22.

The BCU 22 as the electricity storage device controller includes a microcomputer, and is connected to the HC 27 to be described later. The BCU 22 controls the electricity storage device 19. That is, the BCU 22 executes predetermined calculation processing based upon a voltage and a temperature of the lithium-ion secondary cell 20, and a current value measured by the current sensor 21, thus carrying out the state determination, calculation and control of the lithium-ion secondary cell 20.

For example, the BCU 22 calculates possible discharging power from the electricity storage device 19 as a battery discharging power, based upon the current, the voltage and the temperature. Likewise, the BCU 22 calculates possible charging power to the electricity storage device 19 as a battery charging power. The BCU 22 outputs a battery state of charge (SOC), a battery discharging power, a battery charging power and the like to the HC 27.

In addition thereto, the BCU 22 monitors and estimates a state of the electricity storage device 19 based upon the voltage, the current, the temperature, the SOC (State of Charge), a SOH (State of Health) and the like. In a case where any index of the plurality of elements deviates or is likely to deviate from an appropriate use range, the BCU 22 transmits a signal to the HC 27 to issue abnormality alarm.

The relays 23, 24, 25 and the resistance 26 configure a contactor. The relays 23, 24, 25 connect or disconnect an electrical circuit (an electric equipment circuit) to which the inverter 16 and the electricity storage device 19 are connected. That is, the relays 23, 24, 25 establish the connection or disconnection between the electricity storage device 19 (a terminal of the lithium-ion secondary cell 20) and the inverter 16 (a terminal in the DC side thereof). Therefore, the relays 23, 24, 25 are provided between the inverter 16 and the electricity storage device 19. Specifically, the relays 23, 24, 25 are provided between the terminal of the lithium-ion secondary cell 20 and the terminal in the DC side of the inverter 16.

In this case, the relays 23, 24 are provided in parallel connection between a positive side terminal of the lithium-ion secondary cell 20 and a DC side positive electrode of the inverter 16. The resistance 26 is provided in series with the relay 23 between the positive side terminal of the lithium-ion secondary cell 20 and the relay 23 to prevent incoming current at the relay operation. Thereby the relay 23 defines an incoming current preventive circuit together with the resistance 26. The relay 23 and the relay 24 carry out the connection or disconnection between the positive electrode of the lithium-ion secondary cell 20 and the DC side positive electrode of the inverter 16. Meanwhile, the relay 25 is provided between the negative side terminal of the lithium-ion secondary cell 20 and the DC side negative electrode of the inverter 16. The relay 25 carries out the connection or disconnection between the negative electrode of the lithium-ion secondary cell 20 and the DC side negative electrode of the inverter 16.

For example, when an unillustrated ignition key switch turns off, the relays 23, 24, 25 turn off (open), and the electricity storage device 19 (the lithium-ion secondary cell 20) and the inverter 16 are disconnected. Meanwhile, when the ignition key switch turns on by an operator, the relays 23, 24, 25 turn on (close) in response to a command from the HC 27, for example, whereby the electricity storage device 19 (the lithium-ion secondary cell 20) and the inverter 16 are connected. At this time, in regard to the relays 23, 24, 25, first, the relays 23, 25 turn on, and then, the relay 24 turns on and the relay 23 turns off.

The HC 27 as the equipment controller is configured of a microcomputer, for example. The HC 27 is connected electrically (to be capable of communicating) to the ECU 12, the PCU 17, the BCU 22 and the MC 28 using a CAN (Controller Area Network) and the like. The HC 27 is a controller in the upper position (the upper controller) of the BCU 22. Meanwhile, an operation amount sensor (not shown) is connected to the MC 28 to detect an operation amount of each of the traveling lever/pedal operation device and the working lever operation device that are operated by an operator, for example. The MC 28 also includes a microcomputer, for example.

The MC 28 is communicated with the ECU 12 and the HC 27, and transmits various control signals to the ECU 12, the PCU 17 and the HC 27 based upon, for example, the operation amount, the rotational speed of the engine 11, the SOC of the electricity storage device 19, and the like. Thereby, the ECU 12 controls the rotational speed of the engine 11 and the like based upon the control signal from the MC 28. The HC 27 controls the hybrid equipment 15, 16, 19 based upon states of the electric motor 15, the inverter 16 and the electricity storage device 19 as the hybrid equipment and information of the operation amount from the MC 28. The MC 28 controls the hydraulic pump 13 (a capacity thereof) and the control valve 14 (a pilot pressure thereto) based upon the information of the operation amount.

That is, the MC 28 controls the engine 11 and the hydraulic pump 13. In addition thereto, the MC 28 controls the control valve 14 to control the traveling hydraulic motor 2A, the revolving hydraulic motor 3A, and the cylinders 8D, 8E, 8F in the working mechanism 8, as the hydraulic devices. The HC 27 controls the electricity storage device 19 and the inverter 16 and performs coordination control with the MC 28. The HC 27 performs the coordination control with the MC 28 and controls the electric motor 15, the inverter 16 and the BCU 22.

Incidentally according to the conventional technology as described before, the relay disconnecting the electrical circuit is controlled by the single controller. Therefore, for example, in a case where the controller dealing with the control of the relay is in failure or is erroneously operated, the excitation current in the relay cannot be stopped, creating a possibility of being incapable of disconnecting the relay. This is not preferable, for example, since in the lithium-ion secondary cell 20 requiring accurate control of the voltage, the current and the temperature, the abnormal state of the overcharge, the over-discharge, the overtemperature or the like is possibly in progress.

On the other hand, the first embodiment is configured to be capable of controlling the supply and the stop of the excitation current in the relay 25 with the HC 27 as the equipment controller and further, to be capable of controlling the supply and the stop of the excitation current in the relay 25 with the BCU 22 also as the electricity storage device controller. Therefore, an explanation will be made of the control of the relay 25 in the first embodiment with reference to FIG. 4 to FIG. 8 in addition to FIG. 1 to FIG. 3.

Figure 4:
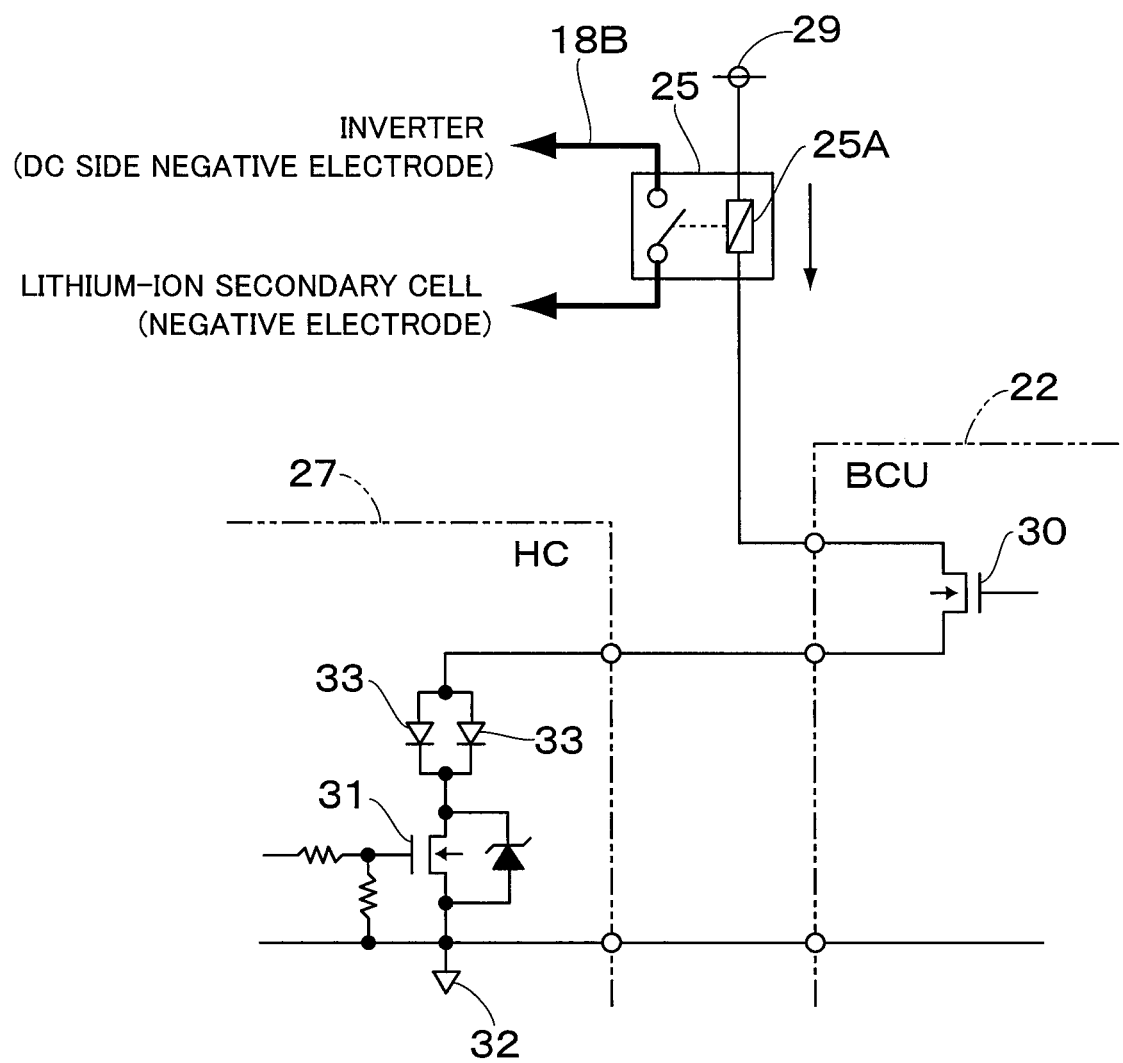
FIG. 4 is a circuit diagram showing a relay, a BCU and an HC.

FIG. 4 shows a relay control circuit. The first embodiment will be explained by taking the relay control circuit for controlling the supply and the stop of the excitation current in the relay 25 in the negative electrode side in the electricity storage device 19 (the lithium-ion secondary cell 20), as an example. The relay control circuit is, however, not limited thereto, but may be configured to control the supply and the stop of the excitation current in the relay 24 (and the relay 23 as needed) in the positive electrode side in the electricity storage device 19 (the lithium-ion secondary cell 20). Further, the relay control circuit may be configured to control the supply and the stop of the excitation current in the relays 25, 24 (and the relay 23 as needed) in both of the negative electrode side and the positive electrode side in the electricity storage device (the lithium-ion secondary cell 20).

In FIG. 4, a power source 29 is a power source as a supply source of the relay excitation current, and for example, can use an in-vehicle battery of 12V, 24V or the like for accessory drive, which is mounted in the hydraulic excavator 1. The power source 29 is connected to an excitation circuit 25A in the relay 25. The relay 25 is connected to the DC side negative electrode of the inverter 16 and the negative electrode of the lithium-ion secondary cell 20. The relay 25 is connected or disconnected by the relay excitation current from the power source 29.

That is, the relay 25 closes (turns on) when the relay excitation current is supplied to the excitation circuit 25A (an excitation coil) from the power source 29 (when the excitation circuit 25A is in power supply), and the negative side of the lithium-ion secondary cell 20 is connected to the DC side negative electrode of the inverter 16. On the other hand, the relay 25 opens (turns off) when the supply of the relay excitation current to the excitation circuit 25A from the power source 29 is stopped (when the excitation circuit 25A is in non-power supply), and the negative side of the lithium-ion secondary cell 20 is disconnected to the DC side negative electrode of the inverter 16.

An excitation current control section configured to control the supply and the stop of the excitation current in the relay 25 is provided in each of the HC 27 and the BCU 22. That is, in the first embodiment, the HC 27 and the BCU 22 each have the excitation current control section configured to control the supply and the stop of the excitation current in the relay 25. The excitation current control section is configured of switches, specifically FET switches 30, 31 as field-effect transistor switches for switching the supply and the stop of the excitation current in the relay 25. The BCU 22 is provided with the first FET switch 30 as the excitation current control section, and the HC 27 is provided with the second FET switch 31 as the excitation current control section. That is, the BCU 22 as the electricity storage device controller has the first FET switch 30 as the relay control section for controlling the supply and the stop of the operating current in the relay 25. The HC 27 as the upper controller has the second FET switch 31 as the relay control section for controlling the supply and the stop of the operating current in the relay 25.

The first FET switch 30 installed (mounted) in the BCU 22 and the second FET switch 31 installed (mounted) in the HC 27 are connected in series. That is, the first FET switch 30 is provided in the BCU 22 with a drain terminal connected to the excitation circuit 25A in the relay 25. The second FET switch 31 is provided in the HC 27 with a drain terminal connected to the FET switch 31 in the BCU 22 and with a source terminal connected to a GND 32 (the vehicle body or the like) as the ground. A pair of diodes 33 are positioned between the first FET switch 30 and the second FET switch 31 and are provided in parallel connection in the HC 27 as a reverse flow preventive device for preventing a reverse flow of the current.

The first FET switch 30 switches in turning on or off by the BCU 22. The second FET switch 31 switches in turning on or off by the HC 27. When the first FET switch 30 and the second FET switch 31 both turn on (close), the relay excitation current is supplied via the power source 29 to the excitation circuit 25A, and the relay 25 turns on (closes). Meanwhile, when at least one of the first FET switch 30 and the second FET switch 31 turns off (opens), the relay excitation current to the excitation circuit 25A is stopped, and the relay 25 turns off (opens).

The first FET switch 30 and the second FET switch 31 each are provided in the controllers (the BCU 22 and the HC 27), but may be provided outside of the controllers. The FET switch and the controller each configured to control the FET switch may comprise two or more ones. For example, a controller in addition to the BCU 22 and the HC 27, that is, a third FET switch may be provided in the MC 28 (in serial connection to the first FET switch 30 and the second FET switch 31). In addition, the PCU 17 as the controller of the inverter 16 may be provided with the third FET switch. Further, the third FET switch may be provided in a controller (not shown) specialized in control at the abnormal time of the relay disconnection, for example.

In the first embodiment, the first FET switch 30 and the second FET switch 31 both are located between the excitation circuit 25A in the relay 25 and the GND 32, but, for example, may be located between the power source 29 and the excitation circuit 25A in the relay 25. In addition, any of the first FET switch 30 and the second FET switch 31 may be located between the power source 29 and the excitation circuit 25A in the relay 25, and the other may be located between the excitation circuit 25A in the relay 25 and the GND 32. Further, in the first embodiment, the field-effect transistor switch is used as the switch, but for example, another switching device such as a bipolar transistor or the like may be used.

In any case, in the first embodiment, the two FET switches 30, 31 each are provided in the BCU 22 and the HC 27, and the two FET switches 30, 31 are in series connected. In a case where the BCU 22 determines that a state of the electricity storage device 19 (the lithium-ion secondary cell 20) is an abnormal state of requiring the stop of the excitation current in the relay 25, the BCU 22 transmits an abnormal signal to the HC 27. That is, the BCU 22 has an electricity storage device abnormal state notifying section 34 configured to notify (inform) the HC 27 of the abnormal state of the electricity storage device 19. In addition hereto, the BCU 22, when a predetermined time T has elapsed after transmitting the abnormal signal, turns off (opens) the first FET switch 30 of the BCU 22 regardless of the state of the relay 25. That is, whether the second FET switch 31 in the HC 27 turns off (opens) or turns on (closes), the excitation current in the relay 25 is stopped by turning off (opens) the first FET switch 30 in the BCU 22.

In this case, the predetermined time T can be in advance set as a time required for the HC 27 to make the current of the inverter 16, finally the current of the electric motor 15 be zero. That is, the predetermined time T can be in advance set as a time slightly longer than a time required for the HC 27 to null output of the inverter 16 (a time required for turning off a gate of IGBT and nulling inverter output), such as approximately several hundred milliseconds to one second.

On the other hand, the HC 27 turns off (opens) the second FET switch 31 in the HC 27 after executing the stop processing based upon the abnormal signal from the BCU 22, and thereby stops the excitation current in the relay 25 and transmits a signal of the state of the relay 25 (for example, the effect that the relay 25 opens) to the other controller (for example, the MC 28, the BCU 22 or the like). In this case, the stop processing of the HC 27 is processing of cutting off the current in the electrical equipment circuit (the electric equipment circuit) to zero. For example, the stop processing of the HC 27 is the processing of outputting a stop command to the PCU 17, nulling the output of the inverter 16 and cutting off the current of the electric motor 15 to zero. The control by the BCU 22 and the HC 27, that is, the control processing of the HC 27 shown in FIG. 5 and the control processing of the BCU 22 shown in FIG. 6 will be in detail explained later.

The hydraulic excavator 1 according to the first embodiment has the configuration as described above, and next, an operation thereof will be explained.

When an operator who has got in the cab 6 activates the engine 11, the hydraulic pump 13 and the electric motor 15 are driven by the engine 11. Thereby, the hydraulic oil delivered by the hydraulic pump 13 is delivered to the traveling hydraulic motor 2A, the revolving hydraulic motor 3A, and the boom cylinder 8D, the arm cylinder 8E and the bucket cylinder 8F in the working mechanism 8 in response to the lever operation and the pedal operation of the traveling lever/pedal operation device and the working lever operation device provided in the cab 6. Thereby, the hydraulic excavator 1 can perform the traveling operation by the lower traveling structure 2, the revolving operation of the upper revolving structure 4, the excavating operation of the working mechanism 8, and the like.

Here, when the output torque of the engine 11 is larger than the drive torque of the hydraulic pump 13 at the operating of the hydraulic excavator 1, the electric motor 15 is driven as a power generator by the extra torque. Thereby, the electric motor 15 generates AC power, and the AC power is converted into DC power by the inverter 16, which is stored in the electricity storage device 19. Meanwhile, when the output torque of the engine 11 is smaller than the drive torque of the hydraulic pump 13, the electric motor 15 is driven as an electric motor by the power from electricity storage device 19, which assists in a drive of the engine 11. At this time, the first FET switch 30 of the BCU 22 and the second FET switch 31 of the HC 27 both turn on (close), creating a state where the excitation current is supplied to the excitation circuit 25A in the relay 25, that is, the relay 25 is in the connection state.

Figure 5:
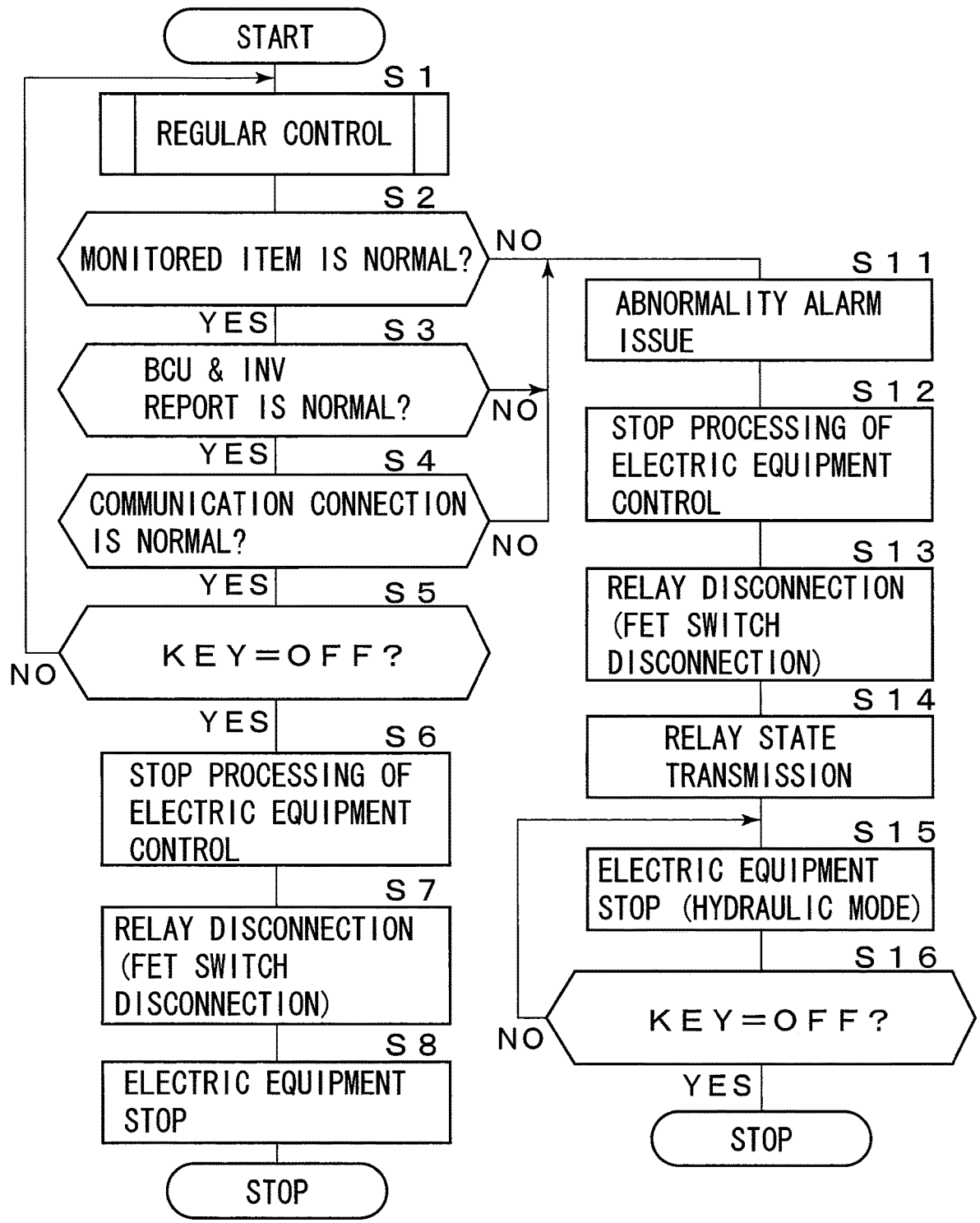
FIG. 5 is a flow chart showing control processing of the HC.
Figure 6:
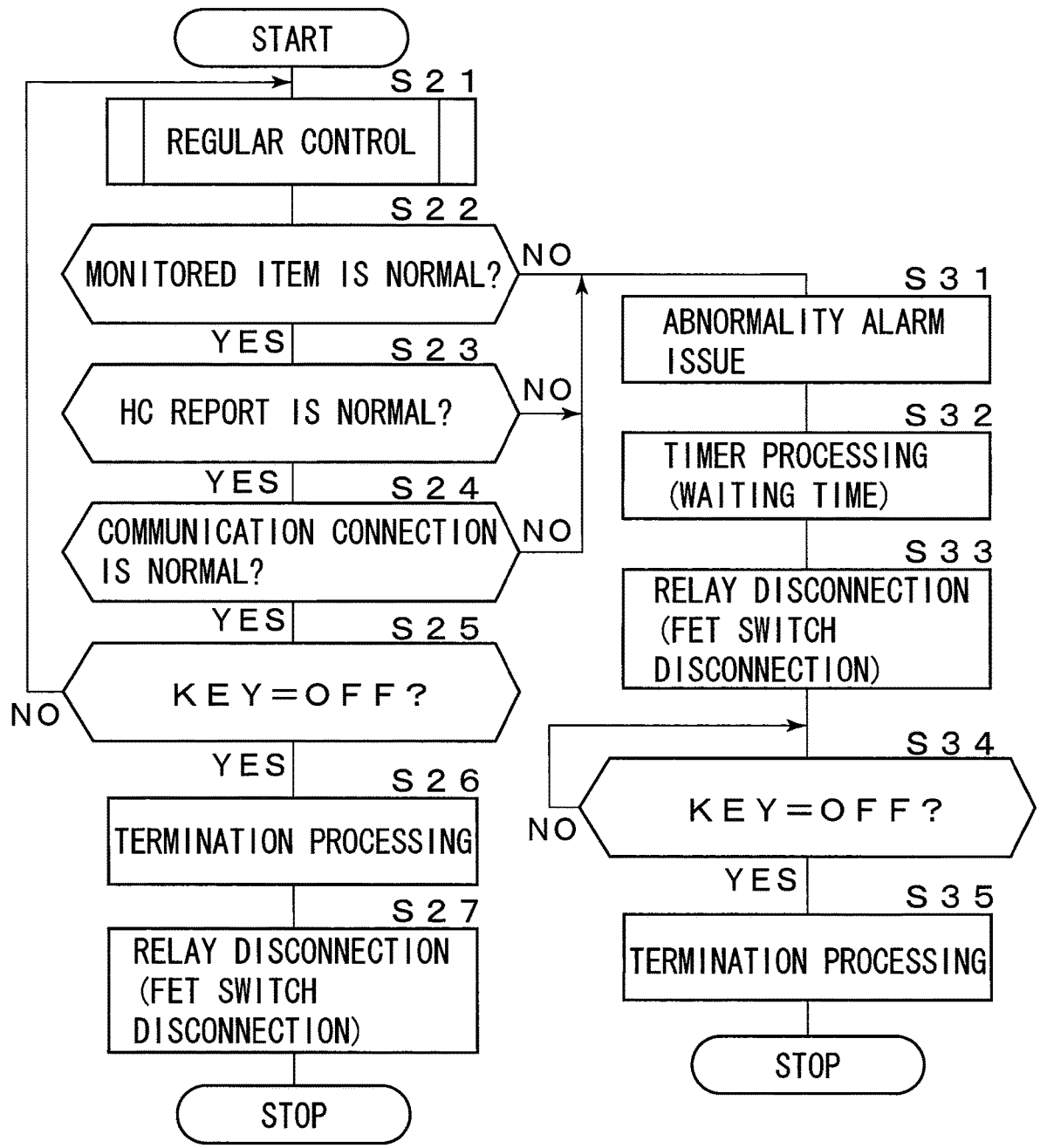
FIG. 6 is a flow chart showing control processing of the BCU.

Next, an explanation will be made of the control processing of the relay 25 by the HC 27 and the BCU 22 with reference to FIG. 5 and FIG. 6. Here, FIG. 5 shows the control processing of the HC 27. FIG. 6 shows the control processing of the BCU 22. Each step in the flow charts shown in FIG. 5 and FIG. 6 uses notation of "S" (for example, step 1="S1").

First, an explanation will be made of the control processing of the HC 27 as shown in FIG. 5. The ignition key switch turns on and the activation processing in the hydraulic excavator 1 is executed. Thereby, when the control processing in FIG. 5 is started, the HC 27 executes regular control processing in S1. In the regular control processing, the HC 27 executes regular control of the electric equipment. That is, the HC 27 executes control (predetermine control) when the inverter 16 as the electric equipment and the electricity storage device 19 are normal. Along with it, the HC 27 executes processing of S2 to S4 as well. The processing of S2 to S4 is processing for observation and determination on whether an operation of various equipment is normal or abnormal.

That is, the HC 27 monitors all of the equipment (electric equipment) in an electric system including the electricity storage device 19. In addition, in S2, soft abnormality is mainly detected. That is, in S2 it is determined whether or not the monitored items of the HC 27 are normal. For example, it is determined whether or not a calculation value of the HC 27 is within an allowable range (a control range). In other words, it is determined whether or not the control of the HC 27 itself is within a normal range.

In S3, it is determined whether or not a state of the electric equipment, that is, states of the electricity storage device 19 and the inverter 16 are normal. That is, in S3, the HC 27 determines whether or not the reports from the BCU 22 and the inverter 16 are normal. For example, the HC 27 determines whether or not a physical numerical value (a detection value) of the electricity storage device 19 obtained from the BCU 22 in the electricity storage device 19 and a physical numerical value (a detection value) of the inverter 16 obtained from the PCU 17 in the inverter 16 each are within an allowable range (a normal range and a control range). In S4, it is determined whether or not a communication connection state is normal. That is, the HC 27 determines whether or not the communication connection state between the BCU 22, the PCU 17 and the MC 28 is normal.

In a case where "YES" is made in determination in S2 to S4, that is, each state is determined to be normal in the determination on whether to be normal, the process goes to S5. In S5, it is determined whether or not the ignition key switch is in an off state. In a case where in S5 "NO" is made, that is, in a case where it is determined that the ignition key switch is in an on state, the process goes back to S1, and the processing subsequent to S1 is repeated. Meanwhile, in a case where "YES" is made in determination in S5, that is, in a case where it is determined that the ignition key switch in the normal state (in a case where no abnormal determination is made) is in the off state, the process goes to S6.

In S6, electric equipment control stop processing is executed. That is, the HC 27 cuts off the current flowing in the electric equipment circuit to zero. For example, the HC 27 outputs a command of setting the output of the inverter 16 to an off state to the PCU 17 to cut off the current of the electric motor 15 to zero. When the current flowing in the electric equipment circuit is cut off to zero in S6, the relay is disconnected in S7. That is, the HC 27 turns off (opens) the second FET switch 31 in the HC 27 to disconnect the relay 25. Thereby, in S8, the electric equipment stops, and then, the HC 27 becomes in the stop state.

On the other hand, in a case where "NO" is made in determination in S2 to S4, that is, each state is determined to be not normal (abnormal) in the determination on whether to be normal, the process goes to S11. In S11, abnormality alarm is issued. For example, the HC 27 transmits a signal (an abnormal signal) that the abnormality occurs, to the BCU 22, the PCU 17 and the MC 28. In subsequent S12, the electric equipment control stop processing is executed. That is, the HC 27, as similar to the processing in S6, cuts off the current flowing in the electric equipment circuit to zero. For example, the HC 27 outputs a command of setting the output of the inverter 16 to the off state to the PCU 17 to cut off the current of the electric motor 15 to zero.

When the current flowing in the electric equipment circuit is cut off to zero in S12, the relay is disconnected in S13. That is, in S13, as similar to the processing in S7, the HC 27 turns off (opens) the second FET switch 31 in the HC 27 to disconnect the relay 25. When the relay 25 is disconnected in S13, the relay state is transmitted in subsequent S14. That is, in S14 the HC 27 transmits the effect that the relay 25 is disconnected, to the BCU 22, for example.

When the relay 25 is disconnected in S13, the electric equipment stops in S15 subsequent to S14. In this state, the electric equipment is stopped, but the hydraulic equipment control becomes in the continuing hydraulic mode. In this hydraulic mode, a vehicle body operation by the hydraulic power is made possible. That is, the hydraulic pump 13 is operating by the engine 11 alone, and the hydraulic excavator 1 is operable by the hydraulic oil to be delivered from the hydraulic pump 13.

In S16 subsequent to S15, it is determined whether or not the ignition key switch is in the off state. In a case where in S16 "NO" is made, that is, the ignition key switch is determined to be in the on state, the process goes back to S15, and the processing subsequent to S15 is repeated. Meanwhile, in a case where "YES" is made indetermination in S16, that is, the ignition key switch is determined to be in the off state, the HC 27 stops.

Next, an explanation will be made of the control processing of the BCU 22 as shown in FIG. 6. The ignition key switch becomes in the on state and the activation processing in the hydraulic excavator 1 is executed. Thereby, when the control processing in FIG. 6 is started, the BCU 22 executes regular control processing in S21. In the regular control processing, the BCU 22 executes regular control of the electricity storage device 19. That is, the BCU 22 executes the control (predetermined control) when the electricity storage device 19 is normal. Along with it, the BCU 22 executes processing of S22 to S24 as well. The processing of S22 to S24 is processing for observation and determination on whether the electricity storage device 19 is normal or abnormal.

That is, the BCU 22 monitors information in regard to the electricity storage device 19. In this case, in S22 it is determined whether or not the monitored items of the BCU 22 are normal. For example, it is determined whether or not each of a voltage, a current, a temperature, an SOC and a SOH of the lithium-ion secondary cell 20 is within an allowable range (a normal range). In S23, it is determined whether or not a report from the HC 27 is normal. That is, the BCU 22 and the HC 27 notify abnormality to each other. In S23, it is determined whether or not the BCU 22 receives a normal signal from the HC 27 (in other words, whether to receive an abnormal signal). In S24, it is determined whether or not the communication connection state is normal. That is, the BCU 22 determines whether or not the communication connection state to the HC 27 is normal.

In a case where "YES" is made in determination in S22 to S24, that is, each state is determined to be normal in the determination on whether to be normal, the process goes to S25. In S25, it is determined whether or not the ignition key switch is in an off state. In a case where in S25 "NO" is made, that is, the ignition key switch is determined to be in an on state, the process goes back to S21, and the processing subsequent to S21 is repeated. Meanwhile, in a case where "YES" is made in determination in S25, that is, in a case where it is determined that the ignition key switch in the normal state (in a case where no abnormal determination is made) is in the off state, the process goes to S26.

In S26, termination processing of the BCU 22 is executed. For example, in S26, the BCU 22 executes termination processing of storage (memory) of data in the lithium-ion secondary cell 20, or the like. When the termination processing of the BCU 22 is executed in S26, the relay disconnection is made in S27. That is, in S27, the BCU 22 turns off (opens) the first FET switch 30 in the BCU 22 to disconnect the relay 25. When the relay 25 is disconnected in S27, the BCU 22 becomes in the stop state.

On the other hand, in a case where "NO" is made in determination in S22 to S24, that is, each state is determined to be not normal (abnormal) in the determination on whether to be normal, the process goes to S31. In S31, abnormality alarm is issued. For example, the BCU 22 transmits a signal (an abnormal signal) of the effect that the abnormality is present, to the HC 27 (the electricity storage device abnormal state notifying section 34). In subsequent S32, timer processing is executed. That is, in S32, the BCU 22 determines whether or not a predetermined time T has elapsed after it is determined that the BCU 22 is not normal (abnormal) (in other words, after the abnormality alarm is issued). In this case, the predetermined time T can be set as a time required for the HC 27 to cut off the current of the electric motor 15 to zero.

When the process waits for the predetermined time T in S32 (when the predetermined time T has elapsed), the process goes to S33, wherein the relay disconnection is performed. That is, in S33, the BCU 22 disconnects the relay 25 by turning off (opening) the first FET switch 30 of the BCU 22.

In S34 subsequent to S33, it is determined whether or not the ignition key switch is in the off state. In a case where in S34 "NO" is made, that is, the ignition key switch is determined to be in the on state, the process goes back before S34, and the processing subsequent to S34 is repeated. Meanwhile, in a case where "YES" is made indetermination in S34, that is, the ignition key switch is determined to be in the off state, the process goes to S35, wherein the terminal processing of the BCU 22 is executed. For example, in S36, the BCU 22 executes the terminal processing of the storage (the memory) of the data in the lithium-ion secondary cell 20, and the like. In S36, when the terminal processing of the BCU 22 is executed, the BCU 22 becomes in the stop state.

Figure 7:
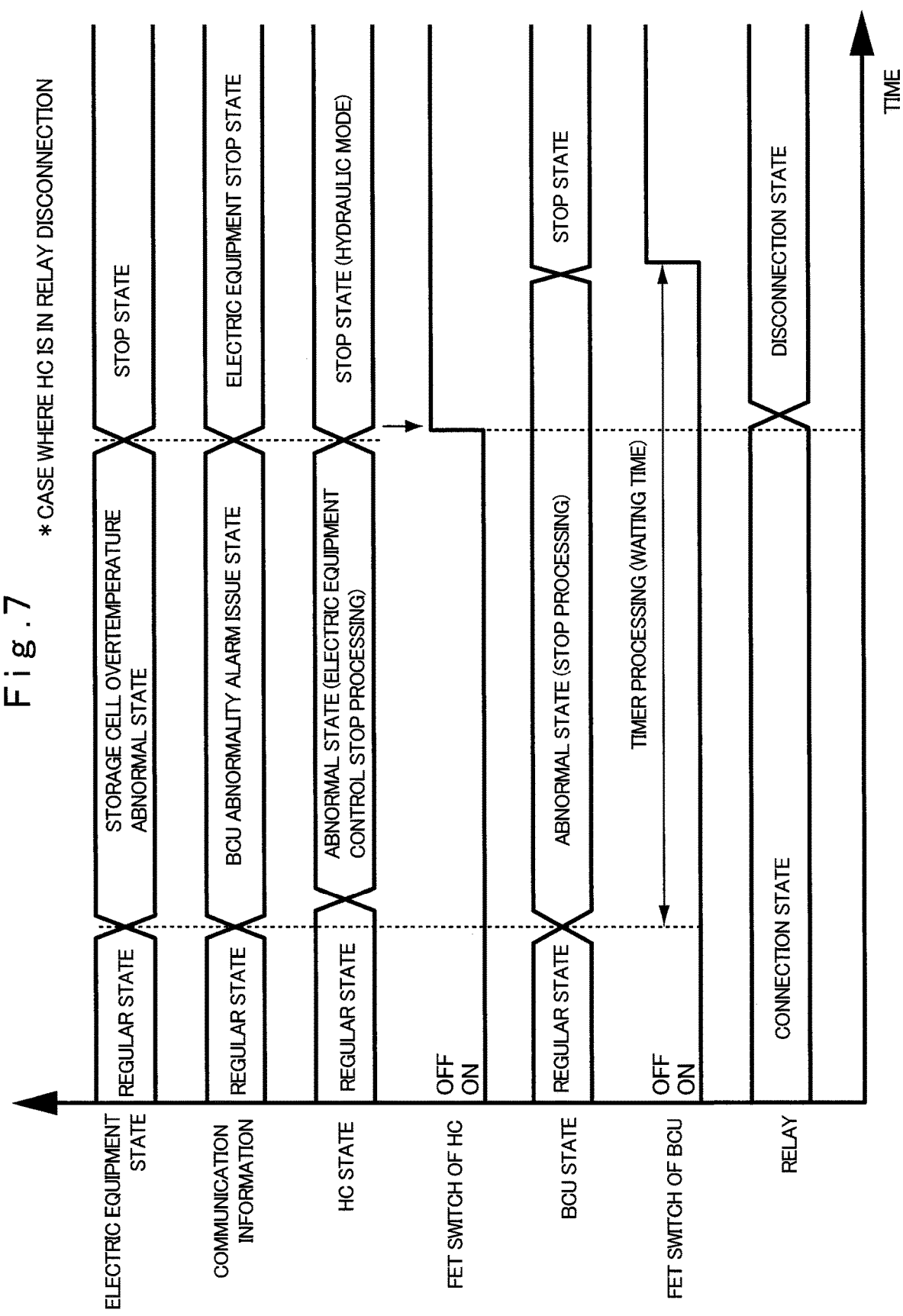
FIG. 7 is a characteristic line diagram showing an example of a time change of electric equipment, the HC, the BCU, the relay and the like in a case where the HC disconnects the relay.

FIG. 7 shows regular abnormal processing in time series in a case where the HC 27 disconnects the relay 25. For example, in the electric equipment state, when the electricity storage device 19 (the lithium-ion secondary cell 20) rises in temperature to be in an overtemperature abnormal state (an electricity storage cell overtemperature abnormal state), the BCU 22 transitions to the abnormal state to issue the abnormality as communication information. At this time, the timer processing starts at the same time. That is, when "NO" is determined in S22 in FIG. 6, the BCU 22 issues abnormality alarm in S31 and starts the timer processing in S32.

Meanwhile, the HC 27 transitions to the abnormal state by the communication information (abnormality alarm issue) of the BCU 22, and executes the stop processing of the electric equipment control, and cuts off the current of the electric equipment circuit to zero. After that, the second FET switch 31 mounted in the HC 27 is made to turn off to disconnect the relay 25. That is, when "NO" is determined in S3 in FIG. 5, the HC 27 executes the stop processing in S12 to cut off the current of the electric equipment circuit to zero. After that, the second FET switch 31 mounted on the HC 27 is caused to turn off by the processing in S13 to disconnect the relay 25.

When the timer processing is completed after the relay 25 is disconnected by the HC 27, the BCU 22 turns off the first FET switch 30 mounted on the BCU 22. That is, when the timer processing in S32 in FIG. 6 is completed (terminated), the BCU 22 turns off the first FET switch 30 in S33. In this case, since the relay 25 is already disconnected by the second FET switch 31 mounted in the HC 27, the state of the relay 25 has no change.

In this way, the timer processing (S32 in FIG. 6) is executed from the abnormal state of the BCU 22 to the relay disconnection in the regular abnormal processing. Accordingly, by stopping the electric equipment control in the meanwhile (in the middle of timer processing) by the HC 27, the relay 25 can be disconnected after setting the current of the electrical equipment circuit to zero. Therefore, it is possible to suppress relay damages due to aback electromotive force or arc discharge at the time of disconnecting the relay 25.

Figure 8:
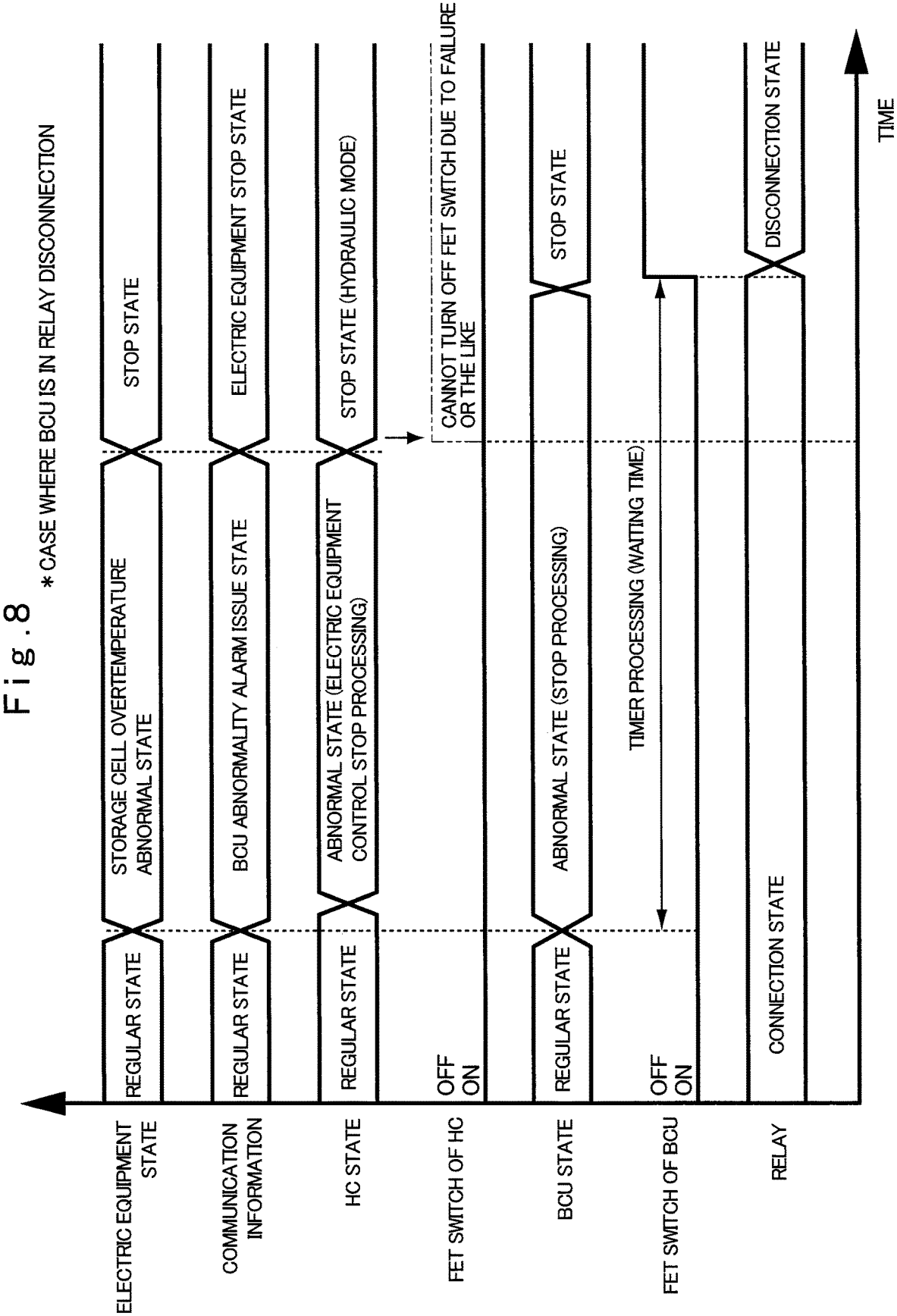
FIG. 8 is a characteristic line diagram showing an example of a time change of the electric equipment, the HC, the BCU, the relay and the like in a case where the BCU disconnects the relay.

Meanwhile, FIG. 8 shows abnormal processing in an emergency in time series in a case where the BCU 22 disconnects the relay 25. For example, in the electric equipment state, when the electricity storage device 19 (the lithium-ion secondary cell 20) rises in temperature to be in an overtemperature abnormal state (an electricity storage cell overtemperature abnormal state), the BCU 22 transitions to the abnormal state to issue the abnormality alarm as communication information. At this time, the timer processing starts at the same time. That is, when "NO" is determined in S22 in FIG. 6, the BCU 22 issues the abnormality alarm in S31 and starts the timer processing in S32.

At this time, in a case where the HC 27 cannot turn off the second FET switch 31 mounted on the HC 27 due to a failure, an erroneous operation or the like, for example, the BCU 22 in which the timer processing is completed turns off the first FET switch 30 mounted on the BCU 22 to disconnect the relay 25. In this way, in an emergency in which the regular relay disconnection cannot be performed by the HC 27, the BCU 22 performs the relay disconnection regardless of the presence or absence of the current in the electric equipment circuit to stop the operation of the electric equipment. Accordingly, it is possible to suppress the lithium-ion secondary cell 20 in the electricity storage device 19 from being in progress in the abnormal state such as overcharging, over-discharging, or overtemperature. As a result, it is possible to improve the safety.

In this way, in the first embodiment, the HC 27 as the equipment controller and the BCU 22 as the electricity storage device controller each include the first FET switch 30 and the second FET switch 31 that are the switches as the excitation current control section. That is, the supply and the stop of the excitation current of the relay 25 can be controlled by the second FET switch 31 of the HC 27 and also by the first FET switch 30 of the BCU 22. Therefore, even when one controller of the HC 27 and the BCU 22 is in failure or is erroneously operated, it is possible to disconnect the relay 25 by stopping the excitation current in the relay 25 with the switch (the first FET switch 30 or the second FET switch 31) of the other controller. Accordingly, it is possible to improve the certainty of the stop of the excitation current in the relay 25, that is, the certainty of the disconnection of the relay 25. As a result, it is possible to improve the safety of the mounted equipment (for example, the electricity storage device 19, the electric motor 15, and the inverter 16) and the vehicle body in the hydraulic excavator 1 as the construction machine.

In the first embodiment, in a case where the BCU 22 determines that the electricity storage device 19 is in the abnormal state, when the predetermined time T has elapsed, the excitation current in the relay 25 is stopped by the first FET switch 30 of the BCU 22 regardless of the state of the relay 25. Therefore, when the predetermined time T has elapsed after the BCU 22 determines that the electricity storage device 19 is in the abnormal state, the excitation current in the relay 25 can be stopped by the first FET switch 30 in the BCU 22 regardless of the failure or the erroneous operation of the HC 27. That is, even when the HC 27 cannot stop the excitation current in the relay 25 by the second FET switch 31 due to the failure or the erroneous operation of the HC 27, it is possible to stop the excitation current in the relay 25 by the first FET switch 30 in the BCU 22 when the predetermined time T has elapsed. Thereby, it is possible to improve the certainty of the stop of the excitation current in the relay 25. Even when the second FET switch 31 is in failure or is erroneously operated, it is possible to stop the excitation current in the relay 25 by the first FET switch 30 in the BCU 22.

In the first embodiment, the field-effect transistors of N channels are used as the first FET switch 30 and the second FET switch 31. In this case, although the illustration is omitted, it is preferable to provide the configuration of the following (1) to (4) in a circuit in FIG. 4.

(1) It is preferable that a reverse flow preventive diode is electrically connected in series between the drain terminal of the first FET switch 30 and the excitation circuit 25A such that a direction from the excitation circuit 25A toward the drain terminal of the first FET switch 30 is the forward direction. The reverse flow preventive diode is to prevent the reverse flow of the excitation current.

(2) It is preferable that a recirculation diode is electrically connected in series between the reverse connection preventive diode side of the excitation circuit 25A and the power source 29-side of the excitation circuit 25A such that a direction from the reverse connection preventive diode side of the excitation circuit 25A toward the power source 29-side of the excitation circuit 25A is the forward direction, to form a recirculation path. The recirculation path is to cause the excitation current flowing in the excitation circuit 25A to be recirculated when the first FET switch 30 turns off.

(3) It is preferable that a protection diode at the ground offset time is electrically connected in series between the source terminal of the first FET switch 30 and the GND 32 such that a direction from the GND 32-side toward the source terminal side of the first FET switch 30 is the forward direction.

(4) It is preferable that a pulldown resistance is electrically connected in series between the gate terminal and the source terminal of the first FET switch 30 to prevent an unintended application of a gate-to-source voltage.

In the first embodiment, the HC 27 executes the stop processing based upon the abnormal signal from the BCU 22, and thereafter, stops the excitation current in the relay 25 by the second FET switch 31 of the HC 27. That is, the HC 27 executes the stop processing, and thereafter, stops the excitation current in the relay 25. Therefore, by the stop processing of the HC 27 the current of the electrical equipment circuit is made to zero, and after that, the excitation current in the relay 25 is stopped, thus making it possible to disconnect the relay 25. Thereby, it is possible to suppress the relay damage due to the back electromotive force or the arc discharge at the relay disconnection. Further, the HC 27 transmits a signal of the relay state. Therefore, it is possible to notify the other controller (for example, the BCU 22) that the relay 25 is disconnected by the second FET switch 31 of the HC 27.

In the first embodiment, the relay 25 the connection and the disconnection of which are controlled by both of the HC 27 and the BCU 22 is provided between the electricity storage device 19 (the lithium-ion secondary cell 20 thereof) and the inverter 16. That is, the relay 25 is provided in the electrical circuit including the electricity storage device 19 (the lithium-ion secondary cell 20 thereof) as the power source and the inverter 16, and the relay 25 disconnects the electricity storage device 19 and the inverter 16. Therefore, the relay 25 can stop the power supply to the inverter 16 by disconnecting the electricity storage device 19 and the inverter 16.

In the first embodiment, the hydraulic excavator 1 is composed of the hybrid construction machine provided with the engine 11 connected mechanically to the electric motor 15. That is, the hydraulic pump 13 is driven by the engine 11 and the electric motor 15. The electricity storage device 19 supplies the power to the electric motor 15, and is charged with the generated power by the electric motor 15. The MC 28 controls the engine 11, the hydraulic pump 13, and the control valve 14 (via the control valve 14 the MC 28 controls the traveling hydraulic motor 2A, the revolving hydraulic motor 3A, and the cylinders 8D, 8E, 8F of the working mechanism 8 as the hydraulic devices). Therefore, it is possible to improve the safety of the mount equipment and the vehicle body in the hybrid hydraulic excavator 1.

Figure 9:
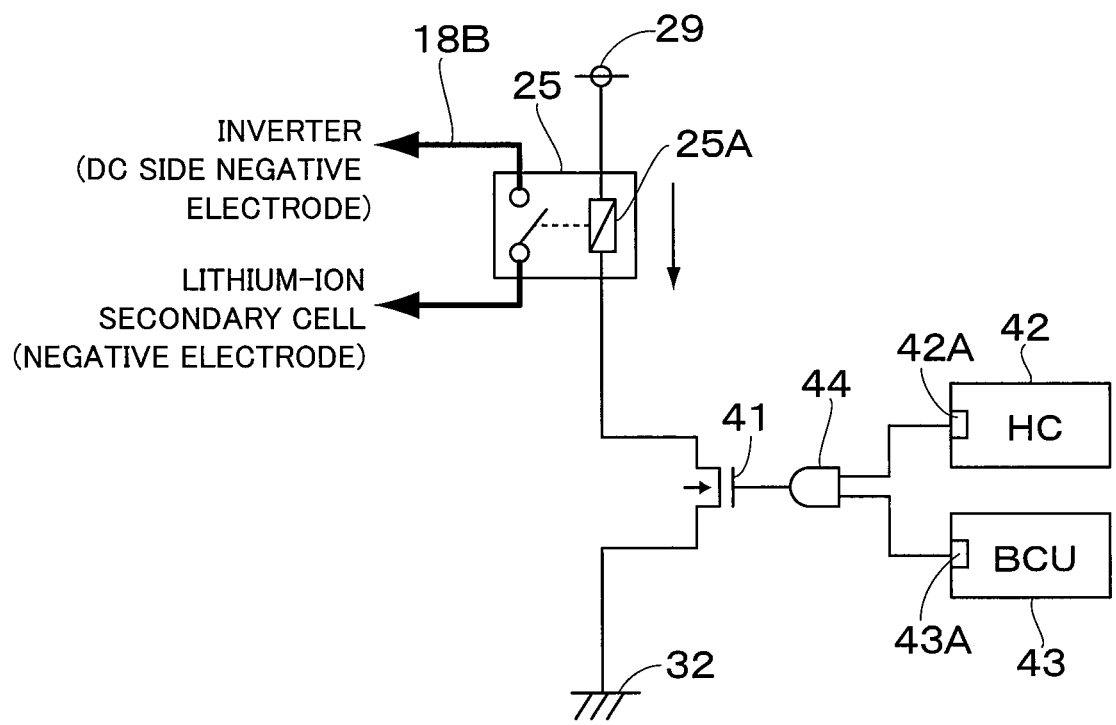
FIG. 9 is a circuit diagram showing a relay, a BCU and an HC according to a second embodiment.

Next, FIG. 9 shows a second embodiment. The second embodiment is characterized in that an excitation current control section in an equipment controller and an excitation current control section in an electricity storage device controller change switches through an AND circuit. It should be noted that in the second embodiment, components identical to those in the first embodiment are referred to as identical reference numerals, and the explanation is omitted.

A single FET switch 41 is provided between the excitation circuit 25A in the relay 25 and the GND 32. The FET switch 41 has a drain terminal connected to the excitation circuit 25A in the relay 25 and a source terminal connected to the GND 32. The FET switch 41 is a switch for switching the supply and the stop of the excitation current in the relay 25.

An HC 42 and a BCU 43 are connected via an AND circuit 44 to the FET switch 41. As similar to the HC 27 in the first embodiment, the HC 42 controls the electric motor 15, the inverter 16, and the BCU 43. As similar to the BCU 22 in the first embodiment, the BCU 43 also controls the electricity storage device 19.

Here, an excitation current control section 42A in the HC 42 outputs 1 (high) to the AND circuit 44 when the relay 25 is caused to turn on (close), that is, when the electricity storage device 19 (the lithium-ion secondary cell 20) and the inverter 16 are connected. On the other hand, for example, when the relay 25 is caused to turn off (open) by the processing in S7 or in S13 in FIG. 5, that is, when the electricity storage device 19 (the lithium-ion secondary cell 20) and the inverter 16 are disconnected, the excitation current control section 42A in the HC 42 outputs 0 (low) to the AND circuit 44.

Here, an excitation current control section 43A in the BCU 43 outputs 1 (high) to the AND circuit 44 when the relay 25 is caused to turn on (close), that is, when the electricity storage device 19 (the lithium-ion secondary cell 20) and the inverter 16 are connected. On the other hand, for example, when the relay 25 is caused to turn off (open) by the processing in S27 or in S33 in FIG. 6, that is, when the electricity storage device 19 (the lithium-ion secondary cell 20) and the inverter 16 are disconnected, 0 (low) is outputted to the AND circuit 44.

When 1 is outputted to the AND circuit 44 from both of the excitation current control section 42A in the HC 42 and the excitation current control section 43A in the BCU 43, 1 is outputted to the FET switch 41. Meanwhile, when 0 is outputted from at least one excitation current control section 42A or 43A of the excitation current control section 42A in the HC 42 and the excitation current control section 43A in the BCU 43, 0 is outputted to the FET switch 41. When 1 is inputted to the FET switch 41 from the AND circuit 44, the FET switch 41 turns on (closes), and When 0 is inputted to the FET switch 41 from the AND circuit 44, the FET switch 41 turns off (opens).

In this way, in the second embodiment also, as similar to the first embodiment, the HC 42 and the BCU 43 each have the excitation current control sections 42A, 43A configured to control the supply and the stop of the excitation current in the relay 25. In this case, in the second embodiment, the excitation current control section 42A in the HC 42 is configured as a command output section that outputs a command signal for turning on or off (closing or opening) the relay 25 to the FET switch 41 via the AND circuit 44. In addition, the excitation current control section 43A in the BCU 43 also is configured as a command output section that outputs a command signal for turning on or off (closing or opening) the relay 25 to the FET switch 41 via the AND circuit 44.

The second embodiment is configured to switch the FET switch 41 via the AND circuit 44 by the excitation current control section 42A in the HC 42 and the excitation current control section 43A in the BCU 43 as described above, and does not differ particularly in the basic function from the first embodiment as described before.

That is, in the second embodiment also, the supply and the stop of the excitation current in the relay 25 can be controlled by the excitation current control section (the command output section) 42A in the HC 42 and also by the excitation current control section (the command output section) 43A in the BCU 43. Therefore, even when one controller of the HC 42 and the BCU 43 is in failure or is erroneously operated, it is possible to disconnect the relay 25 by stopping the excitation current in the relay 25 with the excitation current control section (the command output section) 42A or 43A of the other controller. Accordingly, it is possible to improve the certainty of the stop of the excitation current in the relay 25, that is, the certainty of the disconnection of the relay 25.

It should be noted that in FIG. 9, the FET switch 41 and the AND circuit 44 are provided to be separate from the HC 42 and the BCU 43. However, not limited thereto, the FET switch 41 and the AND circuit 44 may be provided within the HC 42 or the BCU 43, for example.

Figure 10:
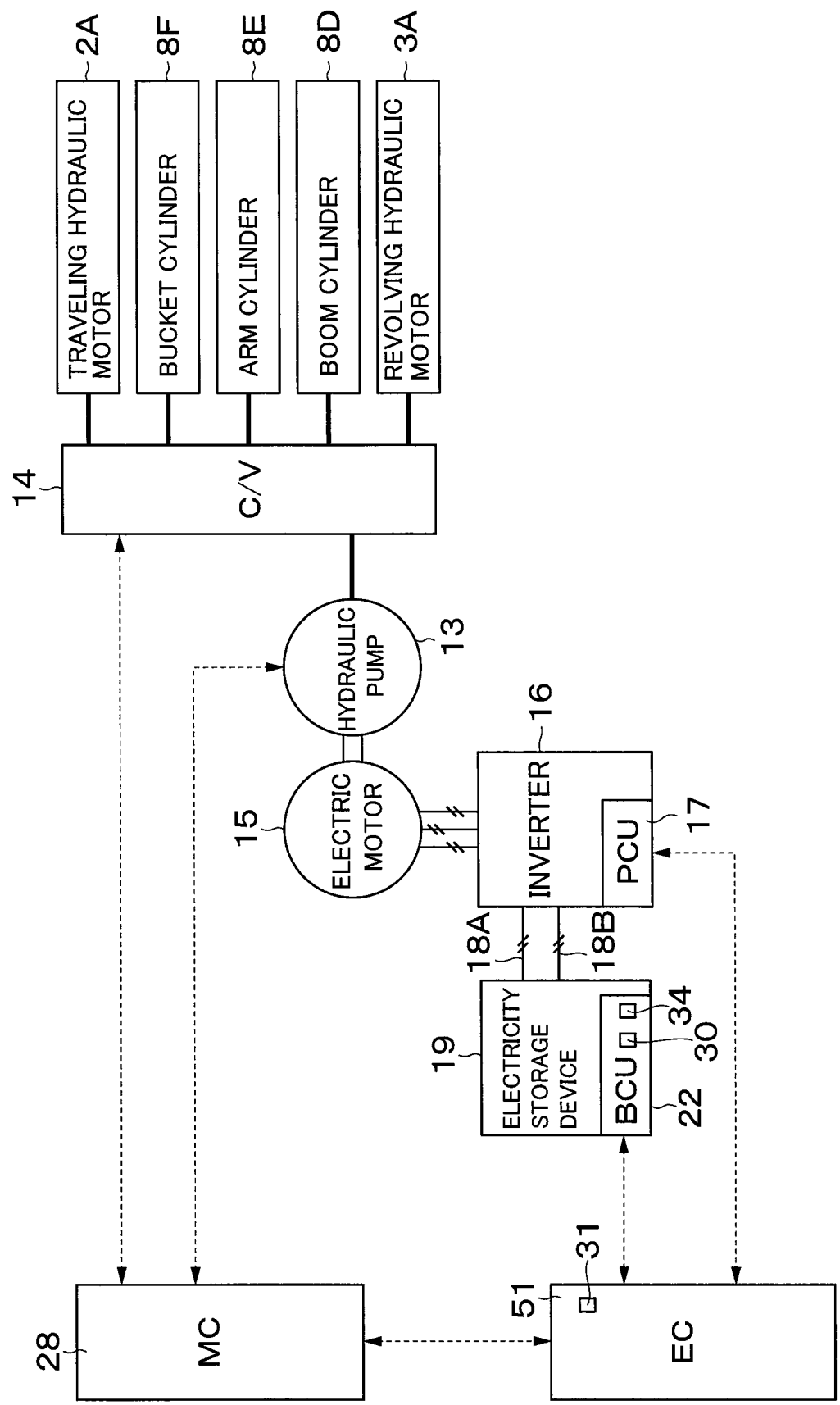
FIG. 10 is a block diagram showing an electric hydraulic excavator according to a third embodiment, as similar to FIG. 2.

Next, FIG. 10 shows a third embodiment. The third embodiment is characterized in that a hydraulic excavator as a construction machine is an electric hydraulic excavator. It should be noted that in the third embodiment, components identical to those in the first embodiment are referred to as identical reference numerals, and the explanation is omitted.

The electric motor 15 drives the hydraulic pump 13 as a driven body. The electricity storage device 19, as similar to the first embodiment, supplies power via the inverter 16 to the electric motor 15. In this case, as shown in FIG. 3 and FIG. 4 in the first embodiment, in the third embodiment also, the electricity storage device 19 is electrically connected via the relay 25 to the inverter 16. The inverter 16 converts the power supplied from the electricity storage device 19 to be supplied to the electric motor 15. The relay 25 is provided between the electricity storage device 19 and the inverter 16 to electrically connect or disconnect the electricity storage device 19 and the inverter 16.

The MC 28 controls the hydraulic pump 13. In addition thereto, the MC 28 controls the control valve 14 to control the traveling hydraulic motor 2A, the revolving hydraulic motor 3A, and the cylinders 8D, 8E, 8F of the working mechanism 8 as the hydraulic devices. An electric equipment controller 51 (hereinafter, referred to as "EC 51") as the equipment controller performs coordination control with the MC 28 and controls the electric motor 15, the inverter 16 and the BCU 22. The EC 51, as similar to the equipment controller (the HC 27) in the first embodiment, responds to the upper controller provided with the relay control section (the second FET switch 31) for controlling the supply and the stop of the operating current in the relay 25. The upper controller (the EC 51 in FIG. 10, and the HC 27 in FIG. 2 as described before) communicates with the BCU 22.

The BCU 22 is the controller of the electricity storage device 19, that is, the electricity storage device controller that manages the state of the electricity storage device 19. In the third embodiment also, as similar to the first embodiment, the BCU 22 and the upper controller (the EC 51) each have the relay control sections (the first FET switch 30 and the second FET switch 31) for controlling the supply and the stop of the operating current in the relay 25. That is, the BCU 22 includes the electricity storage device abnormal state notifying section 34 configured to, when the electricity storage device 19 becomes in the abnormal state of electrically disconnecting the electricity storage device 19 and the inverter 16 by the relay 25, notify the upper controller (the EC 51) of the abnormal state of the electricity storage device 19. In addition thereto, the BCU 22 includes the relay control section (the first FET switch 30) configured to, when the electricity storage device 19 becomes in the abnormal state, stop the supply of the operating current in the relay 25 regardless of the supply of the operating current of the relay 25 is stopped by the upper controller (the EC 51) notifying the abnormal state of the electricity storage device 19.

The relay control section (the first FET switch 30) of the BCU 22, as similar to the first embodiment, stops the supply of the operating current in the relay 25 after the predetermined time T has elapsed after notifying the upper controller (the EC 51) of the abnormal state of the electricity storage device 19. In this case, the predetermined time T is set to be longer than a time from a point where the abnormal state of the electricity storage device 19 is notified until a point where the current flowing between the electricity storage device 19 and the electric motor 15 becomes zero by the disconnection of the relay 25, or a time until a point where the supply of the operating current in the relay 25 is stopped by the relay control section (the second FET switch 31) of the upper controller (the EC 51).

Therefore, in the third embodiment also, as similar to the first embodiment, the EC 51 and the BCU 22 each have the excitation current control sections (the first FET switch 30 and the second FET switch 31) configured to control the supply and the stop of the excitation current in the relay 25. That is, in the third embodiment, the EC 51 has the second FET switch 31 as the excitation current control as similar to the HC 27 in the first embodiment.

The third embodiment is configured to control the supply and the stop of the excitation current in the relay 25 with the second FET switch 31 of the EC 51 and the first FET switch 30 of the BCU 22 as described above, and does not differ particularly in the basic function from the first embodiment as described above. That is, the third embodiment also, as similar to the first embodiment, even when one controller of the EC 51 and the BCU 22 is in failure or is erroneously operated, can disconnect the relay 25 by stopping the excitation current in the relay 25 with the switches (the first FET switch 30 and the second FET switch 31) of the other controller.

The first embodiment is explained by taking a case where the relay 25 provided between the negative side terminal of the lithium-ion secondary cell 20 and the DC side negative electrode of the inverter 16 can be disconnected by both of the HC 27 and the BCU 22, as an example. However, not limited thereto, the relay 24 (and the relay 23 as needed) provided between the positive side terminal of the lithium-ion secondary cell 20 and the DC side positive electrode of the inverter 16 may be disconnected by both of the HC 27 and the BCU 22. In addition, the relays 25, 24 (and the relay 23 as needed) may be disconnected by both of the HC 27 and the BCU 22. This configuration can be likewise applied to the second embodiment and the third embodiment.

The first embodiment is explained by taking a case of using the lithium-ion secondary cell 20 in the electricity storage device 19, as an example, but another secondary cell (for example, a nickel cadmium battery or nickel hydrogen battery) or a capacitor that can supply necessary power may be used. A step-up and -down device such as a DC-DC converter may be provided between an electricity storage device and a DC bus. This configuration can be likewise applied to the second embodiment and the third embodiment.

The first embodiment is explained by taking the hybrid hydraulic excavator 1 of a crawler type as a construction machine, as an example. However, not limited thereto, the present invention can be applied to various kinds of hybrid construction machines such as a wheel type hybrid hydraulic excavator, a hybrid wheel loader, and a hybrid dump truck, which are provided with an electric motor connected to an engine and a hydraulic pump, and an electricity storage device. This configuration can be likewise applied to the second embodiment.

The third embodiment is explained by taking the electric hydraulic excavator of a crawler type as a construction machine, as an example. However, the present invention is not limited thereto, but the present invention can be applied to various kinds of electric construction machines driving a hydraulic pump by an electric motor alone, such as a wheel type electric hydraulic excavator, an electric wheel loader, and an electric dump truck.

Further, each of the embodiments is described as an example, and partial replacement and combination of the components shown in the different embodiments are made possible without mentioning.

In addition, the first to third embodiments are explained by taking a case where the present invention is applied to the electric system to be mounted on the construction machine, but an example of the electric system to which the present invention is applied may include an electric system used for vehicle drive or accessory drive in automobiles such as hybrid cars or electric cars, an electric system to be mounted on industrial vehicles such as forklifts, or an electric system to be mounted on railroad vehicles such as hybrid trains. In this case, the configurations of the electric system are the same as the configurations shown in FIG. 2 or FIG. 10. That is, a mechanical connection destination of the electric motor changes depending upon the electric system, but the configuration of each of the electric motor, the inverter, the electricity storage device and the equipment controller (the HC) explained in the first to third embodiments can be basically applied as it is.

DESCRIPTION OF REFERENCE NUMERALS

1: Hydraulic excavator (Construction machine)
2A: Traveling hydraulic motor (Hydraulic device)
3A: Revolving hydraulic motor (Hydraulic device)
8D: Boom cylinder (Hydraulic device)
8E: Arm cylinder (Hydraulic device)
8F: Bucket cylinder (Hydraulic device)
13: Hydraulic pump (Driven body)
15: Electric motor
16: Inverter
19: Electricity storage device
22, 43: BCU (Electricity storage device controller)
23, 24, 25: Relay
27, 42: HC (Equipment controller, Upper controller)
28: MC (Main controller)
30: First FET switch (Excitation current control section, Relay control section)
31: Second FET switch (Excitation current control section, Relay control section)
34: Electricity storage device abnormal state notifying section
42A: Excitation current control section
43A: Excitation current control section
51: EC (Equipment controller, Upper controller)
T: Predetermined time

The invention claimed is:

1. A construction machine comprising:
an electric motor;
a hydraulic pump driven by the electric motor;
a hydraulic device driven by pressurized oil delivered from the hydraulic pump;
an electricity storage device that supplies power to the electric motor;
an inverter provided between the electricity storage device and the electric motor to convert the power;
a main controller that controls the hydraulic pump and the hydraulic device;
an electricity storage device controller that controls the electricity storage device;
an equipment controller that controls the electric motor, the inverter and the electricity storage device controller; and
a relay connecting or disconnecting an electrical circuit to which the inverter and the electricity storage device are connected, characterized in that:
the equipment controller and the electricity storage device controller each include an excitation current control section that controls supply and stop of an excitation current in the relay.

2. The construction machine according to claim 1, wherein
when a state of the electricity storage device is determined to be an abnormal state requiring the stop of the excitation current in the relay, the electricity storage device controller transmits an abnormal signal to the equipment controller, and when a predetermined time has elapsed, the excitation current in the relay is stopped by the excitation current control section of the electricity storage device controller regardless of the state of the relay.

3. The construction machine according to claim 1, wherein
when a state of the electricity storage device is determined to be an abnormal state requiring the stop of the excitation current in the relay, the electricity storage device controller transmits an abnormal signal to the equipment controller, and
the equipment controller executes stop processing based upon the abnormal signal from the electricity storage device controller, then stops the excitation current in the relay by the excitation current control section of the equipment controller, and transmits a signal of a state of the relay.

4. The construction machine according to claim 1, further comprising:
an engine connected mechanically to the electric motor, wherein
the hydraulic pump is driven by the engine and the electric motor, the electricity storage device supplies the power to the electric motor or is charged with power generated by the electric motor, and the main controller controls the engine, the hydraulic pump and the hydraulic device.

5. An electricity storage device controller in an electricity storage device that is connected electrically via a relay to an inverter and supplies power via the inverter to an electric motor driving a driven body, comprising:

an electricity storage device abnormal state notifying section configured to, when the electricity storage device becomes in an abnormal state of electrically disconnecting the electricity storage device and the inverter by the relay, notify an upper controller provided with a relay control section that controls supply and stop of an operating current in the relay of the abnormal state of the electricity storage device; and a relay control section configured to, when the electricity storage device becomes in the abnormal state of electrically disconnecting the electricity storage device and the inverter by the relay, stop the supply of the operating current in the relay with no relation to whether or not the supply of the operating current in the relay is stopped by the upper controller notifying the abnormal state of the electricity storage device.

6. The electricity storage device controller according to claim 5, wherein the relay control section stops the supply of the operating current in the relay after a predetermined time has elapsed from a point of notifying the upper controller of the abnormal state of the electricity storage device.

7. The electricity storage device controller according to claim 6, wherein the predetermined time is set to be longer than a time from a point where the abnormal state of the electricity storage device is notified until a point where the current flowing between the electricity storage device and the electric motor becomes zero by the disconnection of the relay, or a time until a point where the supply of the operating current in the relay is stopped by the relay control section of the upper controller.

8. An electric system comprising:

an electric motor driving a driven body;

an electricity storage device that supplies power to the electric motor;

an inverter provided between the electric motor and the electricity storage device to convert the power supplied from the electricity storage device and supply the converted power to the electric motor;

a relay provided between the electricity storage device and the inverter to electrically connect or disconnect the electricity storage device and the inverter;

an electricity storage device controller that manages a state of the electricity storage device;

an upper controller that communicates with the electricity storage device controller, characterized in that:

the electricity storage device controller and the upper controller each include a relay control section that controls supply and stop of an operating current in the relay.

9. The electric system according to claim 8, the electricity storage device controller, further comprising:

an electricity storage device abnormal state notifying section configured to, when the electricity storage device becomes in an abnormal state of electrically disconnecting the electricity storage device and the inverter by the relay, notify the upper controller of the abnormal state of the electricity storage device, wherein the relay control section in the electricity storage device controller, when the electricity storage device becomes in the abnormal state of electrically disconnecting the electricity storage device and the inverter by the relay, stops the supply of the operating current in the relay after a predetermined time has elapsed from a point of notifying the abnormal state of the electricity storage device with no relation to whether or not the supply of the operating current in the relay is stopped by the upper controller.

10. The electric system according to claim 9, wherein the predetermined time is set to be longer than a time from a point where the abnormal state of the electricity storage device is notified until a point where the current flowing between the electricity storage device and the electric motor becomes zero by the disconnection of the relay, or a time until a point where the supply of the operating current in the relay is stopped by the relay control section of the upper controller.

* * * * *